(12) United States Patent
Lee et al.

(10) Patent No.: US 12,742,951 B2
(45) Date of Patent: Sep. 22, 2026

(54) ZOOM LENS AND IMAGE PICKUP APPARATUS

(71) Applicant: CANON KABUSHIKI KAISHA, Tokyo (JP)

(72) Inventors: Yonghee Lee, Tochigi (JP); Tomoya Yamada, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 361 days.

(21) Appl. No.: 18/347,620

(22) Filed: Jul. 6, 2023

(65) Prior Publication Data

US 2024/0053592 A1 Feb. 15, 2024

(30) Foreign Application Priority Data

Aug. 9, 2022 (JP) ................................ 2022-127105

(51) Int. Cl.
*G02B 15/14* (2006.01)
*G02B 13/04* (2006.01)
*G02B 13/18* (2006.01)

(52) U.S. Cl.
CPC ...... *G02B 15/144113* (2019.08); *G02B 13/04* (2013.01); *G02B 13/18* (2013.01)

(58) Field of Classification Search
CPC ............ G02B 15/144113; G02B 13/04; G02B 13/18; G02B 15/14
USPC ................ 359/682, 684, 688, 693–698, 705, 359/745–795
See application file for complete search history.

(56) References Cited

U.S. PATENT DOCUMENTS

| | | | |
|---|---|---|---|
| 9,897,803 | B2 | 2/2018 | Sanjo |
| 10,551,599 | B2 | 2/2020 | Yamada |
| 11,061,212 | B2 | 7/2021 | Yamada |
| 11,307,400 | B2 | 4/2022 | Takemoto |

(Continued)

FOREIGN PATENT DOCUMENTS

| | | | |
|---|---|---|---|
| JP | 2018-116182 | A | 7/2018 |
| JP | 2019-139252 | A | 8/2019 |
| JP | 2022022580 | A | 2/2022 |

OTHER PUBLICATIONS

Notice of Reasons for Refusal issued by the Japanese Patent Office on May 26, 2026 in corresponding JP Patent Application No. 2022-127105, with English translation.

*Primary Examiner* — Thomas K Pham
*Assistant Examiner* — Kuei-Jen L Edenfield
(74) *Attorney, Agent, or Firm* — Carter, DeLuca & Farrell LLP

(57) ABSTRACT

A zoom lens includes, in order from an object side to an image side, a first lens unit having positive refractive power that does not move during zooming, an intermediate group that has at least two lens units moving during zooming, a lens unit having positive refractive power that moves during zooming, and a final lens unit having positive refractive power that does not move during zooming. Each distance between adjacent lens units changes during zooming. The intermediate group includes at least one lens unit having negative refractive power and including at least three lenses. Of the at least one lens unit having negative refractive power, a lens unit V disposed closest to an object includes at least one positive lens and at least one negative lens, and a lens disposed closest to the object in the lens unit V is a negative lens. A predetermined condition is satisfied.

15 Claims, 11 Drawing Sheets

(56) References Cited

U.S. PATENT DOCUMENTS

2015/0097995 A1* 4/2015 Wada ............ G02B 15/145125
359/683
2015/0301319 A1* 10/2015 Komatsu ........... G02B 27/1013
359/684
2016/0124199 A1 5/2016 Sanjo
2021/0109330 A1* 4/2021 Hori .................... G02B 15/173
2021/0141197 A1 5/2021 Lee
2022/0003977 A1* 1/2022 Shimada ............... G02B 15/20
2023/0350168 A1 11/2023 Yamada
2023/0350173 A1 11/2023 Lee

* cited by examiner d
g
C
F
M
S
Fno= 3.65
ω= 7.03°
ω= 7.03°
ω= 7.03°
-0.200
0.200
-0.200
0.200
-5.000
5.000
-0.050
0.050
SPHERICAL ABERRATION
ASTIGMATISM
DISTORTION (%)
CHROMATIC ABERRATION

ZOOM LENS AND IMAGE PICKUP APPARATUS

BACKGROUND

Technical Field

One of the aspects of the embodiments relates to a zoom lens and an image pickup apparatus.

Description of Related Art

In order to achieve a high zoom ratio and high optical performance, a positive lead type zoom lens has been known that includes a lens unit having positive refractive power disposed closest to an object and five or more lens units as a whole. Japanese Patent Laid-Open No. 2018-116182 discloses a zoom lens with a zoom ratio of about 17, which includes, in order from the object side to the image side, a first lens unit having positive refractive power, a second lens unit having negative refractive power, a third lens unit having negative refractive power, a fourth lens unit having positive refractive power, and a fifth lens unit having positive refractive power. Japanese Patent Laid-Open No. 2019-139252 discloses a zoom lens with a zoom ratio of about 6.5, which includes, in order from the object side to the image side, a first lens unit having positive refractive power, a second lens unit having negative refractive power, a third lens unit having negative refractive power, a fourth lens unit having negative refractive power, and a fifth lens unit having positive refractive power.

In order to achieve a wide angle of view, a high zoom ratio, and high optical performance using the positive lead type zoom lens, each lens unit needs to have proper refractive power and glass material composition. A zoom lens is demanded that has a wider angle of view, a higher zoom ratio, and higher optical performance than those of the zoom lenses disclosed in Japanese Patent Laid-Open Nos. 2018-116182 and 2019-139252.

SUMMARY

A zoom lens according to one embodiment includes, in order from an object side to an image side, a first lens unit having positive refractive power that does not move during zooming, an intermediate group that has at least two lens units that move during zooming, a lens unit having positive refractive power that moves during zooming, and a final lens unit having positive refractive power that does not move during zooming. Each distance between adjacent lens units changes during zooming. The intermediate group includes at least one lens unit having negative refractive power and including at least three lenses. Of the at least one lens unit having negative refractive power, a lens unit V disposed closest to an object includes at least one positive lens and at least one negative lens, and a lens disposed closest to the object in the lens unit V is a negative lens, and wherein the following inequalities are satisfied:

$$1.930<n\_nf<2.200$$

$$0.648<\theta\_pr+0.00253\times v\_pr<0.678$$

$$-3.00<f1/f2<-1.00$$

where n_nf is a refractive index of a negative lens disposed closest to the object in the lens unit V, θ_pr and v_pr are a partial dispersion ratio and an Abbe number of a positive lens disposed closest to an image plane in the lens unit V, and f1 is a focal length of the first lens unit, and f2 is a focal length of the lens unit V. An image pickup apparatus having the above zoom lens also constitutes another aspect of the embodiment.

Further features of the disclosure will become apparent from the following description of embodiments with reference to the attached drawings.

DESCRIPTION OF THE EMBODIMENTS

Figure 1:
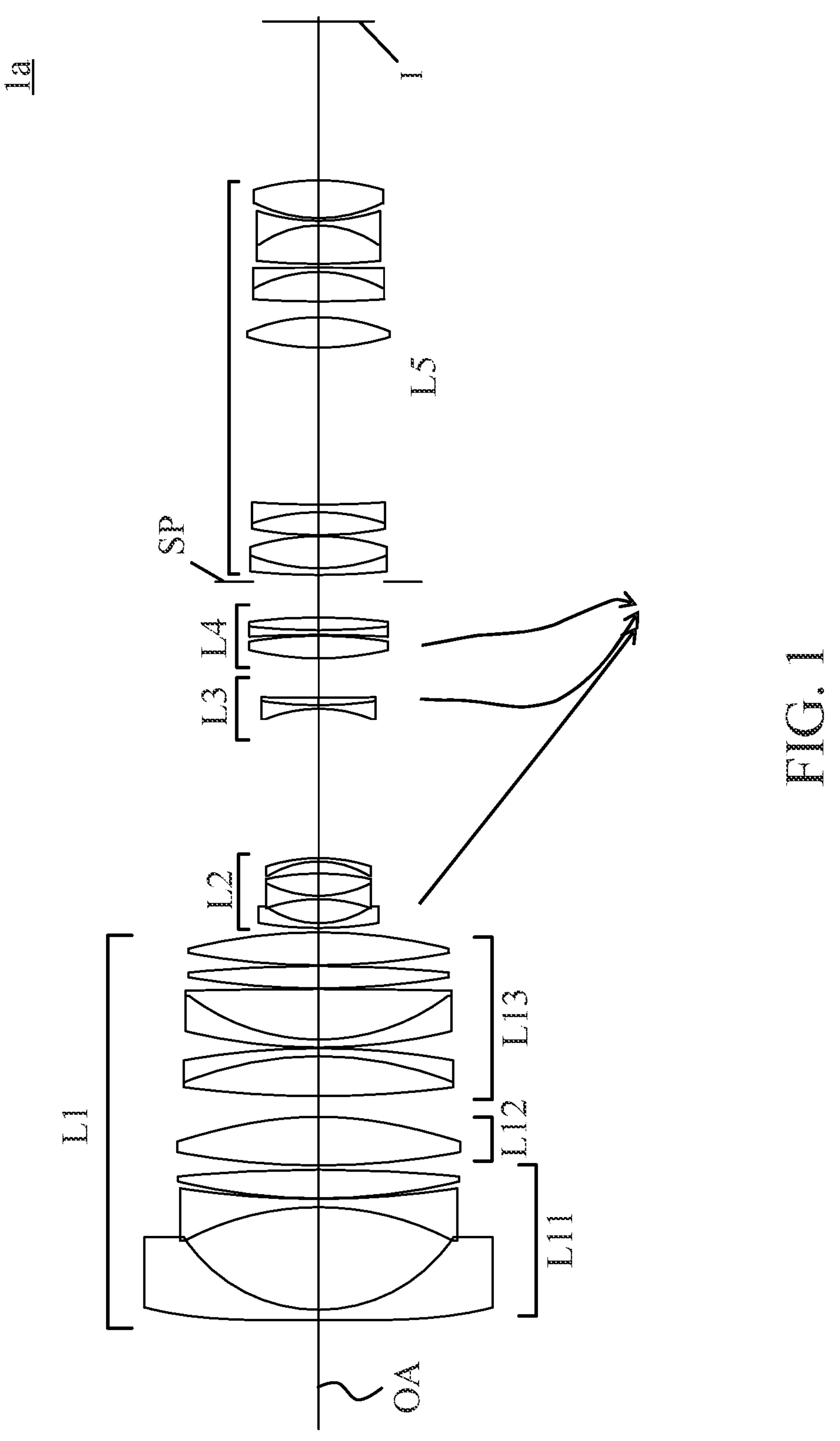
FIG. 1 is a sectional view of a zoom lens according to Example 1.

Referring now to the accompanying drawings, a detailed description will be given of embodiments according to the disclosure.

A zoom lens according to example is suitable for use with a cinema camera, a broadcasting camera, a video camera, a surveillance camera, a digital still camera, a film-based camera, and the like. The zoom lens according to example includes, in order from the object side to the image side, a first lens unit having positive refractive power, an intermediate group, a lens unit having positive refractive power, and a final lens unit having positive refractive power. The first lens unit does not move during zooming. The intermediate group has at least two lens units that move during zooming. The lens unit having positive refractive power moves during zooming. The final lens unit does not move during zooming. Due to zooming, each distance between lens units changes. The intermediate group includes a lens unit having negative refractive power that includes at least three lenses. Of the lens units having negative refractive power, a lens unit V disposed closest to the object has at least one positive lens and at least one negative lens, and a lens disposed closest to the object in the lens unit V is a negative lens.

The following inequalities (1) to (3) are satisfied in each example:

$$1.930<n\_nf<2.200 \quad (1)$$

$$0.648<\theta\_pr+0.00253\times v\_pr<0.678 \quad (2)$$

$$-3.00<f1/f2<-1.00 \quad (3)$$

where n_nf is a refractive index of a negative lens disposed closest to the object in the lens unit V, θ_pr and ν_pr are a partial dispersion ratio and an Abbe number of a positive lens closest to the image plane in the lens unit V, f1 is a focal length of the first lens unit, f2 is a focal length of the lens unit V.

The Abbe number νd of a certain material is expressed as follows:

$$\nu d=(Nd-1)/(NF-NC)$$

where Nd, NF, and NC are refractive indices based on the d-line (587.6 nm), the F-line (486.1 nm), and the C-line (656.3 nm) in the Fraunhofer line, respectively.

The partial dispersion ratio θ is expressed as follows:

$$\theta=(Ng-NF)/(NF-NC)$$

where Ng, NF, and NC as refractive indices for the g-line (435.8 nm), F-line (486.1 nm), and C-line (656.3 nm) in the Fraunhofer line, respectively.

Inequality (1) defines a characteristic of a glass material of the negative lens disposed closest to the object in the lens unit V. Using the glass material that satisfies inequality (1) can achieve a refractive power arrangement beneficial to a wider angle of view and can suppress various aberrations. In a case where the value becomes higher than the upper limit of inequality (1), the transmittance of the existing glass material is particularly low on the short wavelength side, and noise is likely to occur in a blue object in a case where sensitivity is corrected in an image pickup apparatus. On the other hand, in a case where the value becomes lower than the lower limit of inequality (1), it becomes difficult to achieve a wide angle and suppress various aberrations.

Inequality (2) defines a characteristic of a glass material of the positive lens disposed closest to the image plane among the positive lenses included in the lens unit V. Using the glass material that satisfies inequality (2) can suppress the zoom fluctuation of the lateral chromatic aberration. In a case where the value becomes higher than the upper limit of inequality (2), it becomes difficult to satisfactorily correct the lateral chromatic aberration at the wide-angle end and the zoom fluctuation of the lateral chromatic aberration. On the other hand, in a case where the value becomes lower than the lower limit of inequality (2), it becomes difficult to satisfactorily correct longitudinal chromatic aberration at the telephoto end.

Inequality (3) defines a ratio of the focal lengths of the first lens unit and the lens unit V. Satisfying inequality (3) can realize a power arrangement beneficial to a wider angle. In a case where the value is higher than the upper limit of inequality (3), the refractive power of the first lens unit becomes stronger, and it becomes difficult to suppress various aberrations. On the other hand, in a case where the value becomes lower than the lower limit of inequality (3), it becomes difficult to achieve a wide angle.

In each example, at least one of the following inequalities (4) to (9) may be satisfied.

$$-2.50<f2/fw<0.00 \quad (4)$$

$$0.70<f21/f2<2.00 \quad (5)$$

$$1.70<n\_ave<2.00 \quad (6)$$

$$60<\nu<100 \quad (7)$$

$$-0.0030<(\theta\_pr-\theta\_nr)/(\nu\_pr-\nu\_nr)<0.0000 \quad (8)$$

$$-0.0025<(\theta\_pave-\theta\_nave)/(\nu\_pave-\nu\_nave)<0.0000 \quad (9)$$

where fw is a focal length of the zoom lens at the wide-angle end, f21 is a focal length of a lens disposed closest to the object in the lens unit V, n_ave is an average refractive index of all lenses included in the lens unit V, ν is an Abbe number of the negative lens included in the lens unit V, θ_nr and ν_nr are a partial dispersion ratio and an Abbe number of a lens closest to the image plane among the negative lenses included in the lens unit V, θ_pave and ν_pave are an average partial dispersion ratio and an average Abbe number of all positive lenses included in the lens unit V, and θ_nave and ν_nave are an average partial dispersion ratio and an average Abbe number of all negative lenses included in the lens unit V.

Inequality (4) defines a ratio of the focal length of the lens unit V to the focal length of the zoom lens at the wide-angle end. Satisfying inequality (4) can achieve a high zoom ratio and can suppress various aberrations. In a case where the value becomes higher than the upper limit of inequality (4), the refractive power of the lens unit V becomes weak, and the lens becomes larger in an attempt to achieve a high zoom ratio. On the other hand, in a case where the value becomes lower than the lower limit of inequality (4), the refractive power of the lens unit V becomes strong, and it becomes difficult to suppress various aberrations.

Inequality (5) defines a ratio of the focal length of the lens disposed closest to the object in the lens unit V to the focal length of the lens unit V. Satisfying inequality (5) can achieve a wide angle and suppress various aberrations. In a case where the value is higher than the upper limit of inequality (5), the refractive power of the lens closest to the object becomes weak, and it becomes difficult to achieve a wide angle. On the other hand, in a case where the value becomes lower than the lower limit of inequality (5), the refractive power of the lens disposed closest to the object becomes too strong, and it becomes difficult to suppress various aberrations.

Inequality (6) defines the average value of the refractive indices of all lenses included in the lens unit V. Satisfying inequality (6) can satisfactorily correct various aberrations and can suppress an increase in the size of the lens. In a case where the value becomes higher than the upper limit of inequality (6), a difference in Abbe number between the positive lens and the negative lens becomes small, and the refractive power of each lens becomes large, and it becomes difficult to correct various aberrations. On the other hand, in a case where the value becomes the lower limit of inequality (6), the refractive power of the lens unit V cannot be increased, and the zoom lens becomes larger.

Inequality (7) defines a characteristic of a glass material of the negative lens included in the lens unit V. Satisfying inequality (7) can satisfactorily correct longitudinal chromatic aberration at the telephoto end. In a case where the value becomes higher than the upper limit of inequality (7), that range is not present in existing glass materials. On the other hand, in a case where the value becomes lower than the lower limit of inequality (7), it becomes difficult to satisfactorily correct longitudinal chromatic aberration at the telephoto end.

Inequality (8) defines an achromatic condition of the two lenses on the image side of the lens unit V. Satisfying inequality (8) can satisfactorily correct longitudinal chromatic aberration and lateral chromatic aberration. In a case where the value becomes higher than the upper limit of inequality (8), it becomes difficult to satisfactorily correct longitudinal chromatic aberration. On the other hand, in a case where the value becomes lower than the lower limit of inequality (8), it becomes difficult to satisfactorily correct the lateral chromatic aberration at the wide-angle end and the zoom fluctuation of the lateral chromatic aberration.

Inequality (9) defines an achromatic condition of the lens unit V. Satisfying inequality (9) can satisfactorily correct longitudinal chromatic aberration and lateral chromatic aberration. In a case where the value becomes higher than the upper limit of inequality (9), it becomes difficult to satisfactorily correct longitudinal chromatic aberration. On the other hand, in a case where the value becomes lower than the lower limit of inequality (9), it becomes difficult to satisfactorily correct the lateral chromatic aberration at the wide-angle end and the zoom fluctuation of the lateral chromatic aberration.

In each example, two lenses disposed closest to the image plane in the lens unit V include a positive lens and a negative lens. This configuration can easily correct the zoom fluctuation of the lateral chromatic aberration.

In each example, the lens unit V may consist of four lenses. This configuration can easily suppress various aberrations, especially correct zoom fluctuations of various off-axis aberrations on the wide-angle side.

In each example, the first lens unit may include, in order from the object side to the image side, a first sub-lens unit having negative refractive power, a second sub-lens unit having positive refractive power, and a third sub-lens unit having positive refractive power. Each distance between adjacent sub-lens units changes during focusing. The first sub-lens unit does not move during focusing, the second sub-lens unit moves during focusing, and the third sub-lens unit does not move during focusing. This configuration is effective in achieving a wide angle.

In each example, inequalities (1) to (9) may be replaced with inequalities (1a) to (9a) below:

$$1.940<n\_nf<2.150 \quad (1a)$$

$$0.658<\theta\_pr+0.00253\times\nu\_pr<0.677 \quad (2a)$$

$$-2.80<f1/f2<-1.15 \quad (3a)$$

$$-2.30<f2/fw<-0.50 \quad (4a)$$

$$0.80<f21/f2<1.90 \quad (5a)$$

$$1.73<n\_ave<1.93 \quad (6a)$$

$$62<\nu<97 \quad (7a)$$

$$-0.0029<(\theta\_pr-\theta\_nr)/(\nu\_pr-\nu\_np)<-0.0001 \quad (8a)$$

$$-0.0024<(\theta\_pave-\theta\_nave)/(\nu\_pave-\nu\_nave)<-0.0001 \quad (9a)$$

In each example, inequalities (1) to (9) may be replaced with inequalities (1b) to (9b) below:

$$1.950<n\_nf<2.100 \quad (1b)$$

$$0.668<\theta\_pr+0.00253\times\nu\_pr<0.676 \quad (2b)$$

$$-2.60<f1/f2<-1.30 \quad (3b)$$

$$-2.10<f2/fw<-1.30 \quad (4b)$$

$$0.90<f21/f2<1.80 \quad (5b)$$

$$1.76<n\_ave<1.86 \quad (6b)$$

$$64<\nu<95 \quad (7b)$$

$$-0.0028<(\theta\_pr-\theta\_nr)/(\nu\_pr-\nu\_nr)<-0.0002 \quad (8b)$$

$$-0.0023<(\theta\_pave-\theta\_nave)/(\nu\_pave-\nu\_nave)<-0.0002 \quad (9b)$$

The zoom lens according to each example will be described in detail below.

Example 1

Figures 2A, 2B:
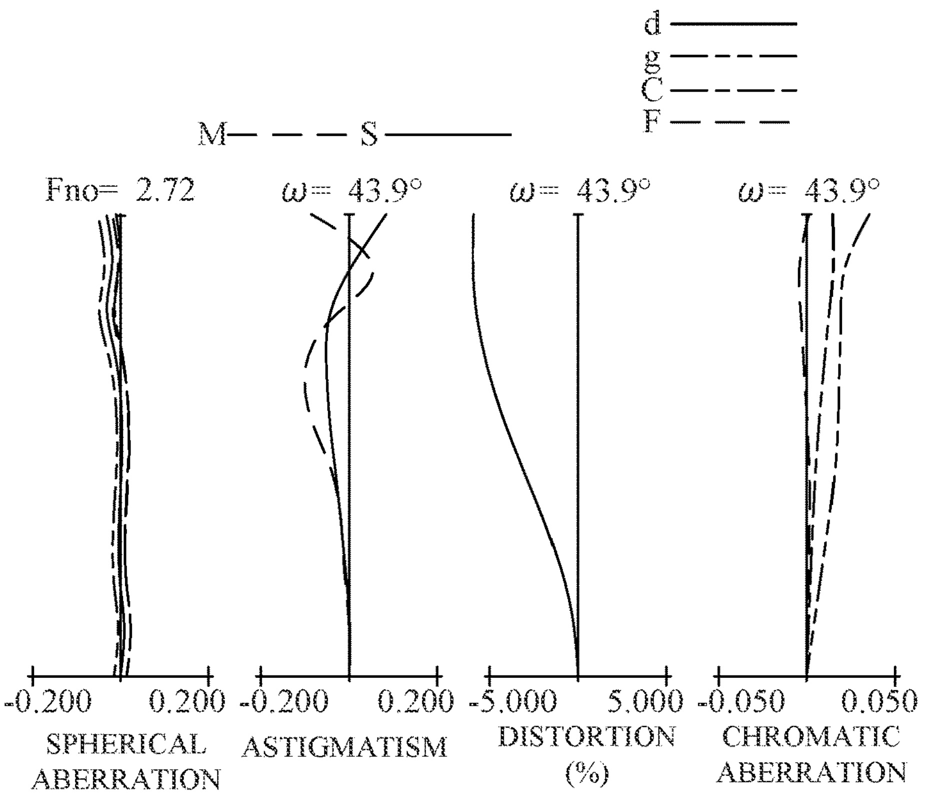
FIGS. 2A and 2B are aberration diagrams of the zoom lens according to Example 1.

Referring now to FIGS. 1, 2A, and 2B, a description will be given of a zoom lens 1*a* according to Example 1 of the present disclosure. FIG. 1 is a sectional view of the zoom lens 1*a* at the wide-angle end in an in-focus state at infinity (on an infinity object). FIG. 2A is an aberration diagram of the zoom lens 1*a* at the wide-angle end in the in-focus state at infinity, and FIG. 2B is an aberration diagram of the zoom lens 1*a* at the telephoto end in the in-focus state at infinity. In a case where the zoom lens according to example is used as an imaging optical system of an imaging apparatus, the object side is the left side and the image side is the right side in each sectional view.

The zoom lens 1*a* includes, in order from the object side to the image side, a first lens unit L1 having positive refractive power, a second lens unit L2 having negative refractive power, a third lens unit L3 having negative refractive power, a fourth lens unit L4 having positive refractive power, an aperture stop SP, and a fifth lens unit L5 having positive refractive power. The first lens unit L1 does not move during zooming. The second lens unit L2 and the third lens unit L3 move during zooming and constitute an intermediate group. The fourth lens unit L4 moves during zooming. The fifth lens unit L5 is a final lens unit for imaging and does not move during zooming.

The first lens unit L1 includes, in order from the object side to the image side, a first sub-lens unit L11 having negative refractive power, a second sub-lens unit L12 having positive refractive power, and a third sub-lens unit L13 having positive refractive power. The second sub-lens unit L12 is a focus lens unit that moves from the object side to the image side during focusing from infinity to a short distance (finite distance). The second lens unit L2 is a variator lens unit having negative refractive power that moves toward the image side during zooming from the wide-angle end to the telephoto end. The second lens unit L2 corresponds to the lens unit V in this example. An extender lens or the like for focal length conversion may be mounted in the fifth lens unit L5. In FIG. 1, symbol "I" denotes an image plane, which corresponds to an imaging plane of an image sensor (photoelectric conversion element such as a CCD sensor or a CMOS sensor) configured to receive an optical image formed by the zoom lens 1*a*. Arrows in FIG. 1 indicate moving loci on the optical axis OA during zooming from the wide-angle end to the telephoto end.

A description will be given of each aberration diagram. A solid line, an alternate long and two short dashes line, an alternate long and short dash line, and a broken line in a spherical aberration diagram illustrate spherical aberration amounts the d-line, g-line, C-line, and F-line, respectively. Solid and broken lines in an astigmatism diagram illustrate astigmatism amounts on a sagittal image plane (ΔS) and a meridional image plane (ΔM), respectively. An alternate long and two short dashes line, an alternate long and short dash line, and a broken line in a lateral chromatic aberration diagram illustrate lateral chromatic aberration amounts for the g-line, C-line, and F-line, respectively. Astigmatism and lateral chromatic aberration indicate aberration amounts in a case where a ray passing through the center of a light beam at the aperture stop position is considered to be the principal ray. ω represents a paraxial half angle of view (degrees), and Fno represents the F-number (aperture value). In the longitudinal aberration diagram, the scale is 0.2 mm for the spherical aberration diagram, 0.2 mm for the astigmatism diagram, 5% for the distortion diagram, and 0.05 mm for the lateral chromatic aberration diagram. In each example, the wide-angle end and the telephoto end refer to zoom positions in a case where the second lens unit is mechanically located at both ends of the movable range on the optical axis OA. A description of the sectional view of the zoom lens and the aberration diagrams is similarly applied to the following examples unless otherwise specified.

Example 2

Figure 3:
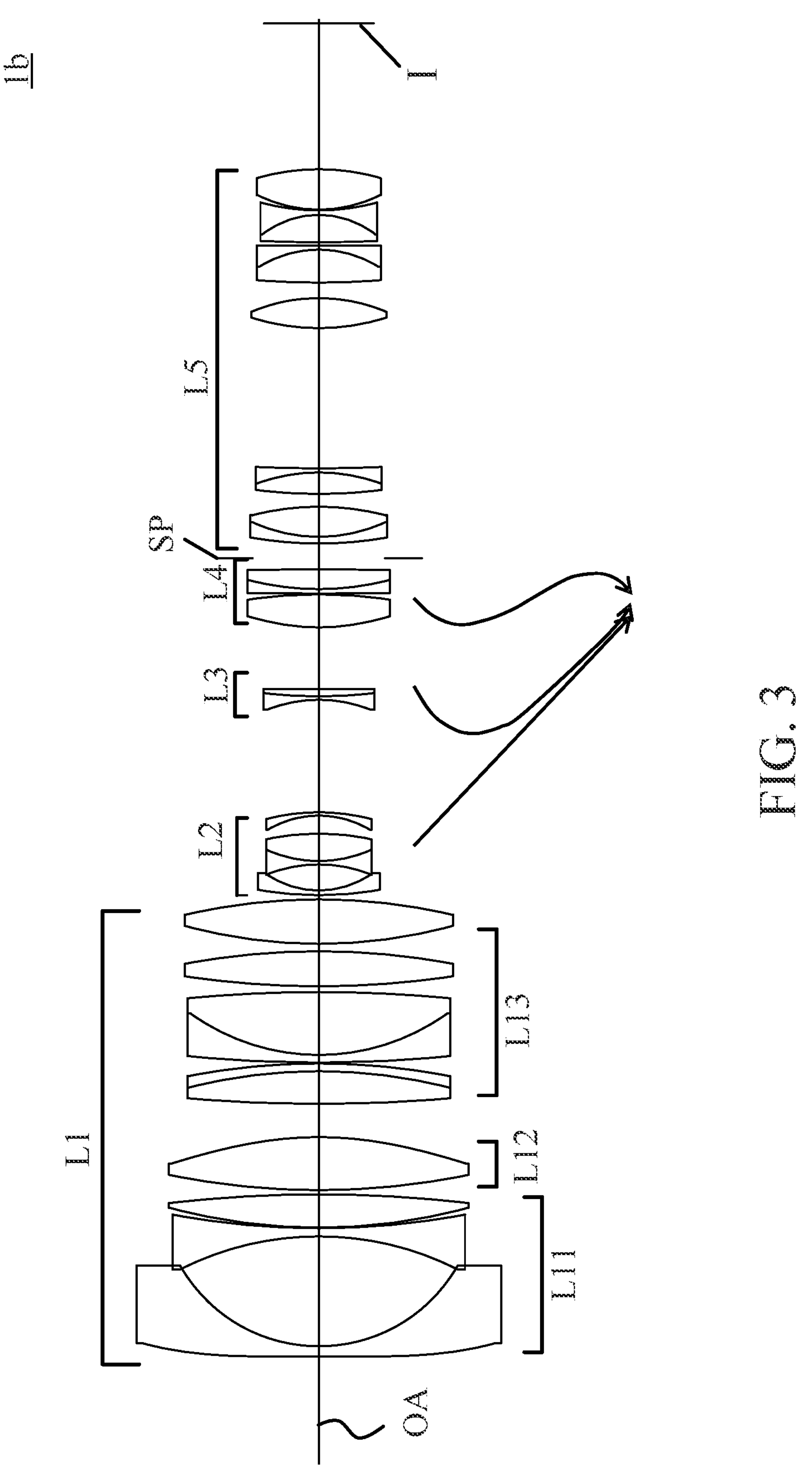
FIG. 3 is a sectional view of a zoom lens according to Example 2.
Figure 4A:
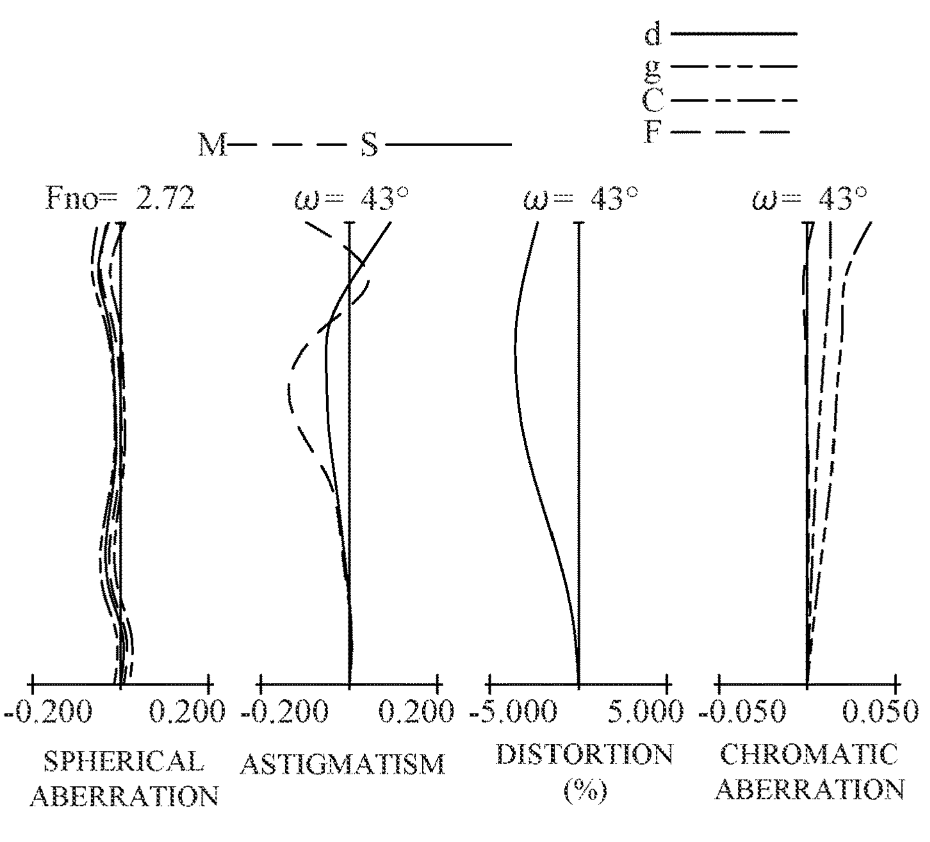
FIGS. 4A and 4B are aberration diagrams of the zoom lens according to Example 2.
Figure 4B:
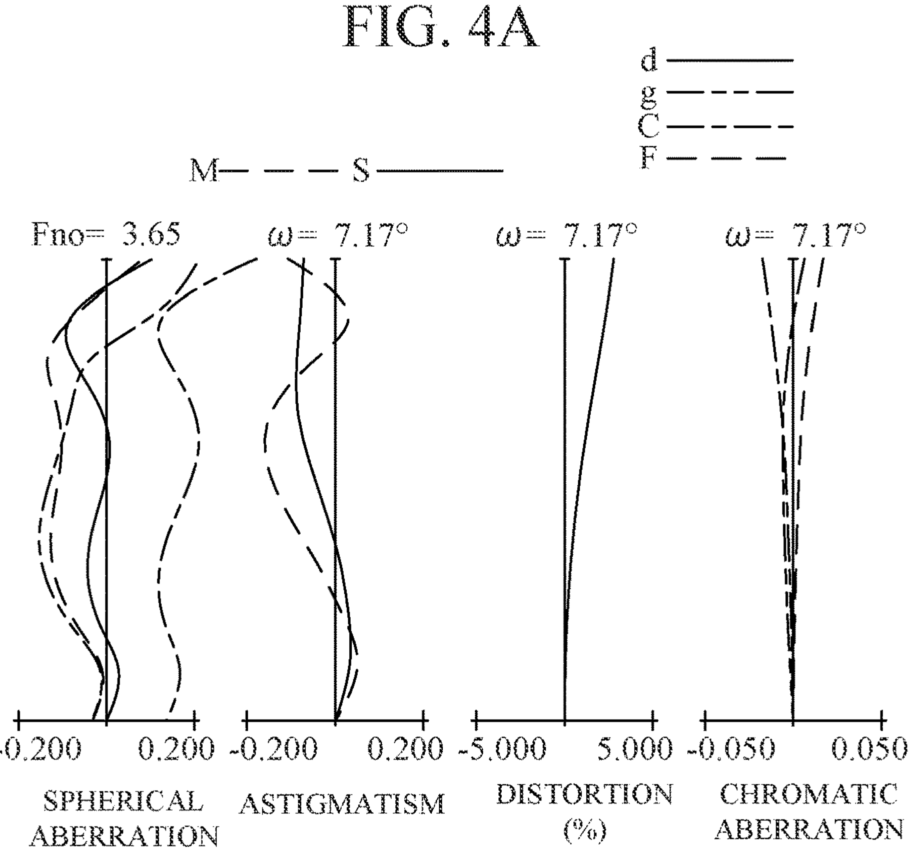

Referring now to FIGS. 3, 4A, and 4B, a description will be given of a zoom lens 1*b* according to Example 2 of the present disclosure. FIG. 3 is a sectional view of the zoom lens 1*b* at the wide-angle end in an in-focus state at infinity. FIG. 4A is an aberration diagram of the zoom lens 1*b* at the wide-angle end in the in-focus state at infinity, and FIG. 4B is an aberration diagram of the zoom lens 1*b* at the telephoto end in the in-focus state at infinity.

The zoom lens 1*b* includes, in order from the object side to the image side, a first lens unit L1 having positive refractive power, a second lens unit L2 having negative refractive power, a third lens unit L3 having negative refractive power, a fourth lens unit L4 having positive refractive power, an aperture stop SP, and a fifth lens unit L5 having positive refractive power. The first lens unit L1 does not move during zooming. The second lens unit L2 and the third lens unit L3 move during zooming and constitute an intermediate group. The fourth lens unit L4 moves during zooming. The fifth lens unit L5 is a final lens unit for imaging and does not move during zooming.

The first lens unit L1 includes, in order from the object side to the image side, a first sub-lens unit L11 having negative refractive power, a second sub-lens unit L12 having positive refractive power, and a third sub-lens unit L13 having positive refractive power. The second sub-lens unit L12 is a focus lens unit that moves from the object side to the image side during focusing from infinity to a short distance. The second lens unit L2 is a variator lens unit having negative refractive power that moves toward the image side during zooming from the wide-angle end to the telephoto end. The second lens unit L2 corresponds to the lens unit V in this example. The fourth lens unit L4 moves together with the aperture stop SP during zooming. An extender lens or the like for focal length conversion may be mounted in the fifth lens unit L5. In FIG. 3, symbol "I" denotes an image plane, which corresponds to an imaging plane of an image sensor (photoelectric conversion element such as a CCD sensor or a CMOS sensor) configured to receive an optical image formed by the zoom lens 1*b*. Arrows in FIG. 3 indicate moving loci on the optical axis OA during zooming from the wide-angle end to the telephoto end.

Example 3

Figure 5:
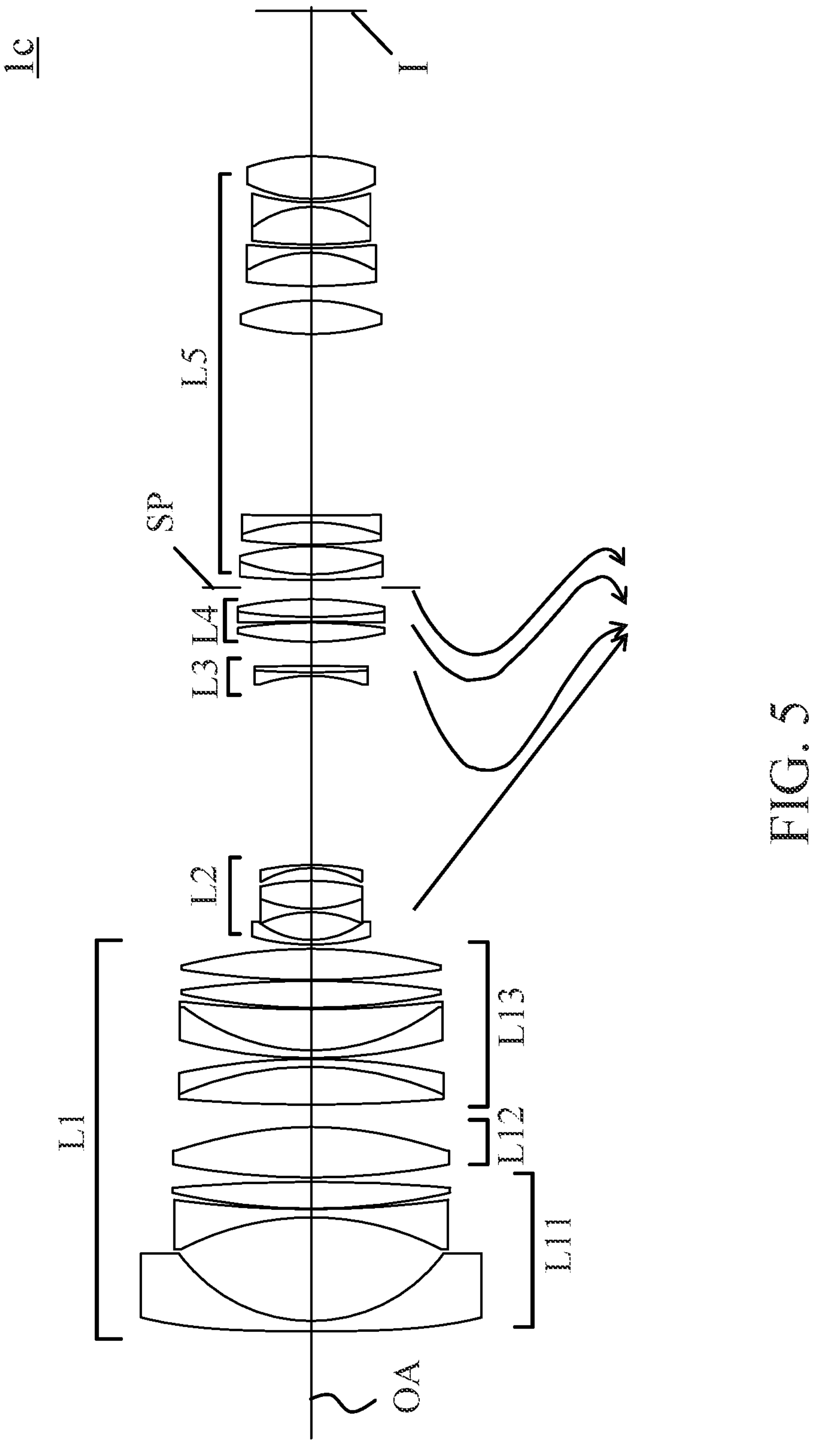
FIG. 5 is a sectional view of a zoom lens according to Example 3.
Figures 6A, 6B:
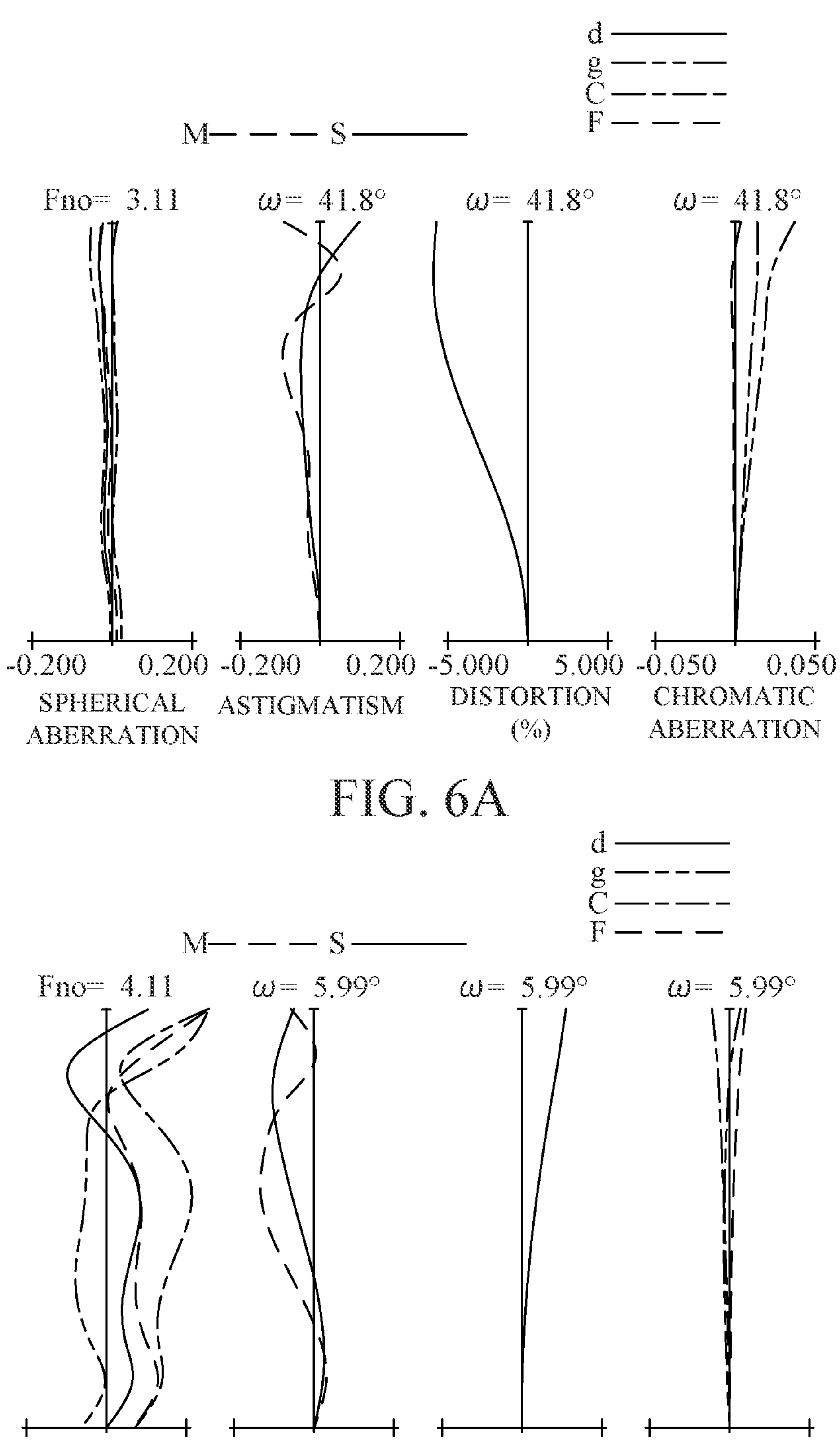
FIGS. 6A and 6B are aberration diagrams of the zoom lens according to Example 3.

Referring now to FIGS. 5, 6A, and 6B, a description will be given of a zoom lens 1*c* according to Example 3 of the present disclosure. FIG. 5 is a sectional view of the zoom lens 1*c* at a wide-angle end in the in-focus state at infinity. FIG. 6A is an aberration diagram of the zoom lens 1*c* at the wide-angle end in the in-focus state at infinity, and FIG. 6B is an aberration diagram of the zoom lens 1*c* at the telephoto end in the in-focus state at infinity.

The zoom lens 1*c* includes, in order from the object side to the image side, a first lens unit L1 having positive refractive power, a second lens unit L2 having negative refractive power, a third lens unit L3 having negative refractive power, a fourth lens unit L4 having positive refractive power, an aperture stop SP, and a fifth lens unit L5 having positive refractive power. The first lens unit L1 does not move during zooming. The second lens unit L2 and the third lens unit L3 move during zooming and constitute an intermediate group. The fourth lens unit L4 moves during zooming. The fifth lens unit L5 is a final lens unit for imaging and does not move during zooming.

The first lens unit L1 includes, in order from the object side to the image side, a first sub-lens unit L11 having negative refractive power, a second sub-lens unit L12 having positive refractive power, and a third sub-lens unit L13 having positive refractive power. The second sub-lens unit L12 is a focus lens unit that moves from the object side to the image side during focusing from infinity to a short distance. The second lens unit L2 is a variator lens unit having negative refractive power that moves toward the image side during zooming from the wide-angle end to the telephoto end. The second lens unit L2 corresponds to the lens unit V in this example. The aperture stop SP moves during zooming. An extender lens or the like for focal length conversion may be mounted in the fifth lens unit L5. In FIG. 5, symbol "I" denotes an image plane, which corresponds to an imaging plane of an image sensor (photoelectric conversion element such as a CCD sensor or a CMOS sensor) configured to receive an optical image formed by the zoom lens 1*c*. Arrows in FIG. 5 indicate moving loci on the optical axis OA during zooming from the wide-angle end to the telephoto end.

Example 4

Figure 7:
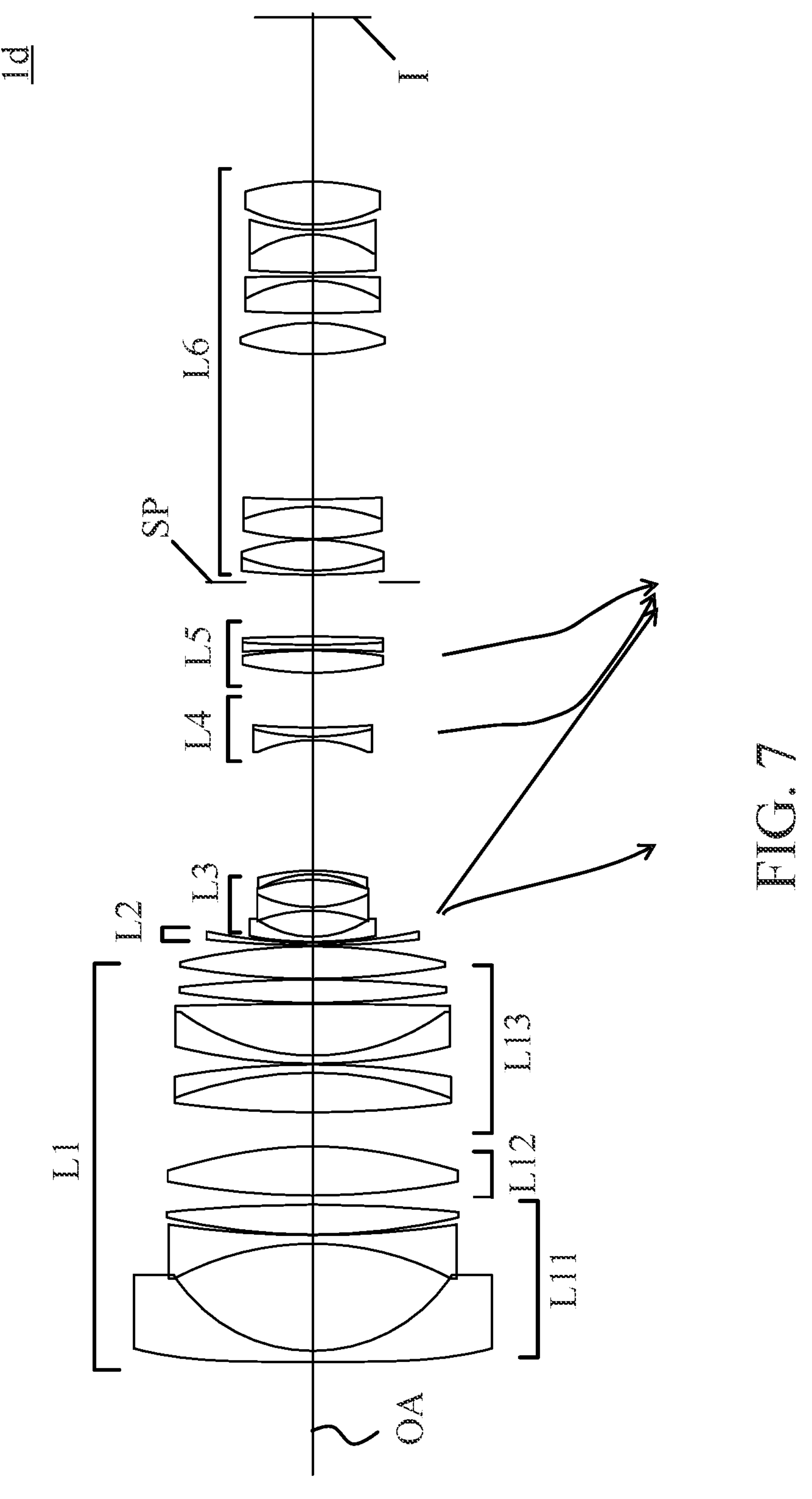
FIG. 7 is a sectional view of a zoom lens according to Example 4.
Figures 8A, 8B:
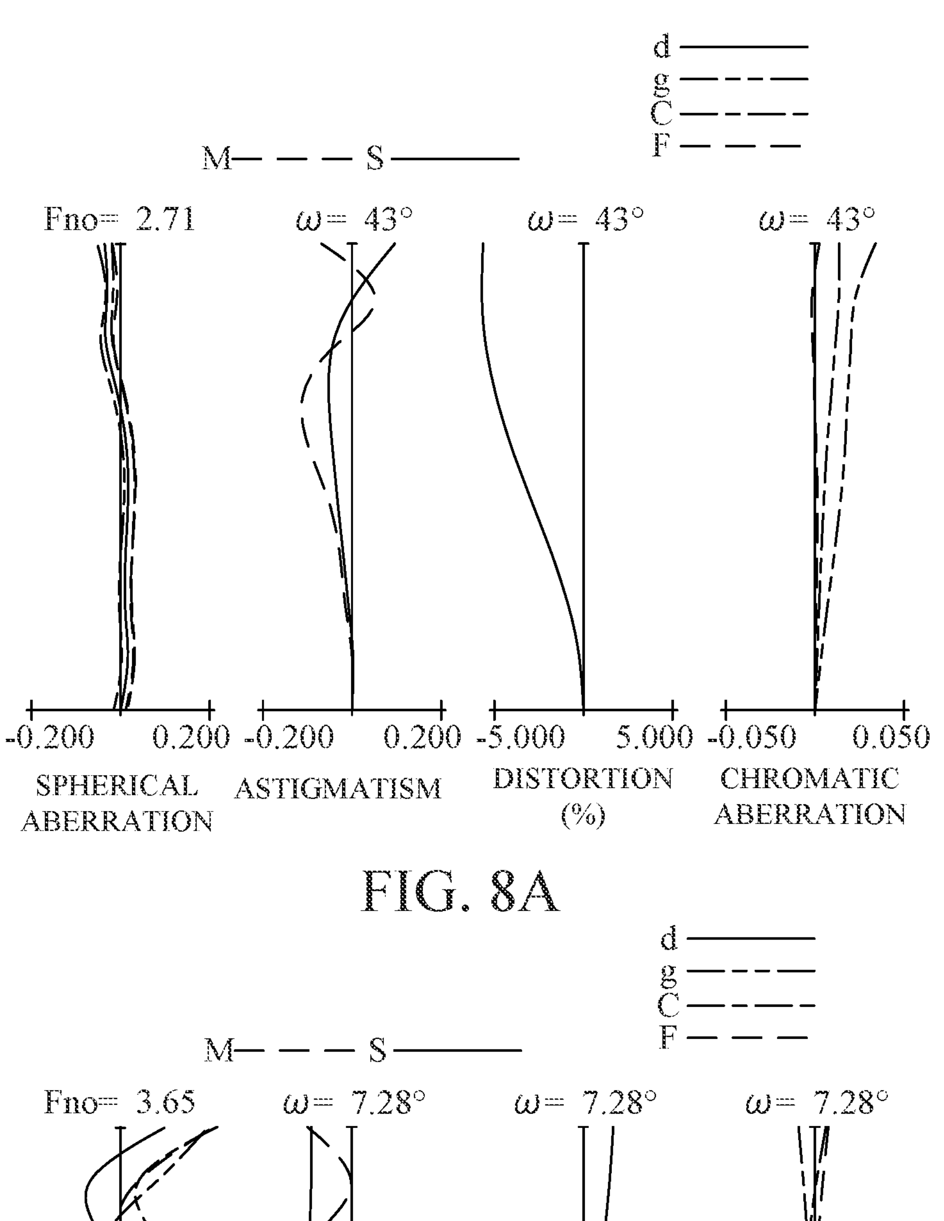
FIGS. 8A and 8B are aberration diagrams of the zoom lens according to Example 4.

Referring now to FIGS. 7, 8A, and 8B, a description will be given of a zoom lens 1*d* according to Example 4 of the present disclosure. FIG. 7 is a sectional view of a zoom lens 1*d* at the wide-angle end in an in-focus state at infinity. FIG. 8A is an aberration diagram of the zoom lens 1*d* at the wide-angle end in the in-focus state at infinity, and FIG. 8B is an aberration diagram of the zoom lens 1*d* at the telephoto end in the in-focus state at infinity.

The zoom lens 1*d* includes, in order from the object side to the image side, a first lens unit L1, a second lens unit L2, a third lens unit L3, a fourth lens unit, a fifth lens unit L5, an aperture stop SP, and a sixth lens unit L6. The first lens unit L1 has positive refractive power and does not move during zooming. The second lens unit L2, the third lens unit L3, and the fourth lens unit L4 all have negative refractive powers and move during zooming. The second lens unit L2, the third lens unit L3, and the fourth lens unit L4 constitute an intermediate group. The fifth lens unit L5 has positive refractive power and moves during zooming. The sixth lens unit L6 is a final lens unit for imaging, has positive refractive power, and does not move during zooming.

The first lens unit L1 includes, in order from the object side to the image side, a first sub-lens unit L11 having negative refractive power, a second sub-lens unit L12 having positive refractive power, and a third sub-lens unit L13 having positive refractive power. The second sub-lens unit L12 is a focus lens unit that moves from the object side to the image side during focusing from infinity to a short distance. The third lens unit L3 is a variator lens unit having negative refractive power that moves toward the image side during zooming from the wide-angle end to the telephoto end. The third lens unit L3 corresponds to the lens unit V in this example. An extender lens or the like for focal length conversion may be mounted in the sixth lens unit L6. In FIG. 7, symbol "I" denotes an image plane, which corresponds to an imaging plane of an image sensor (photoelectric conversion element such as a CCD sensor or a CMOS sensor) configured to receive an optical image formed by the zoom lens 1*d*. Arrows in FIG. 7 indicate moving loci on the optical axis OA during zooming from the wide-angle end to the telephoto end.

Example 5

Figure 9:
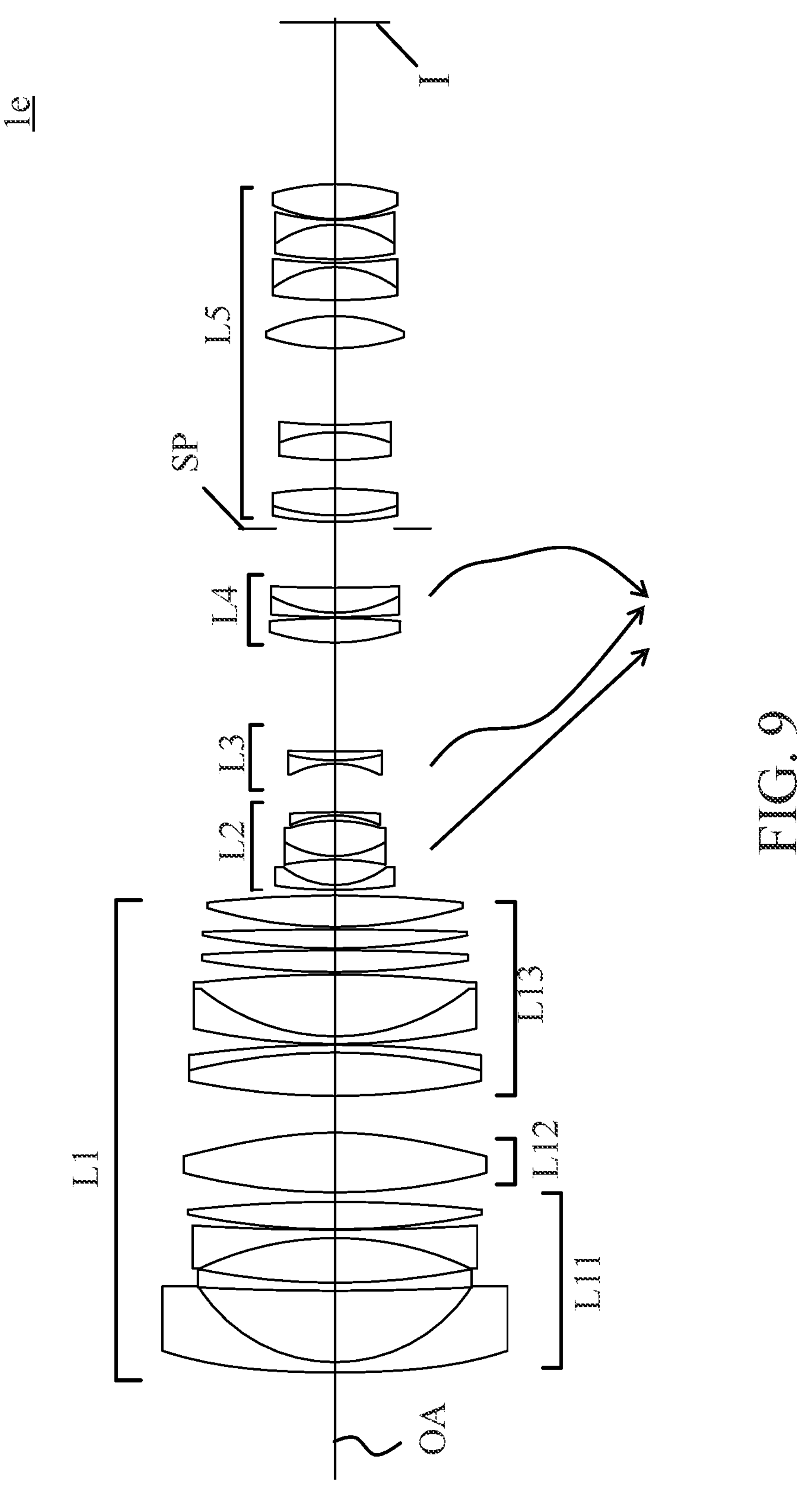
FIG. 9 is a sectional view of a zoom lens according to Example 5.
Figure 10A:
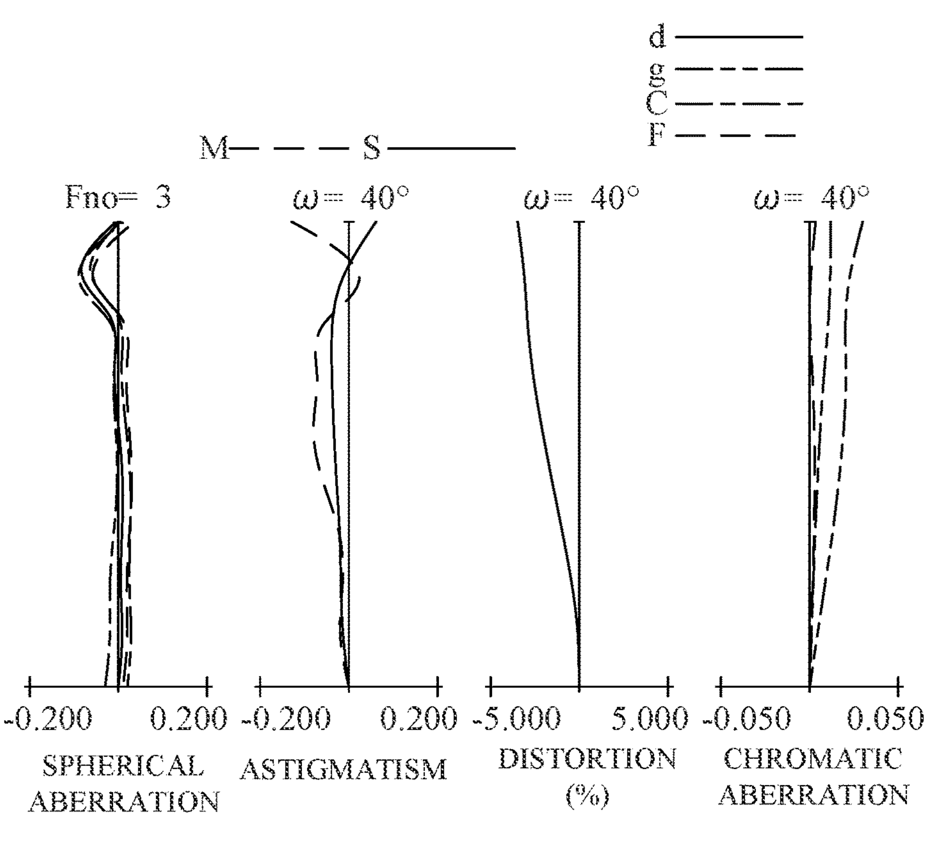
FIGS. 10A and 10B are aberration diagrams of the zoom lens according to Example 5.
Figure 10B:
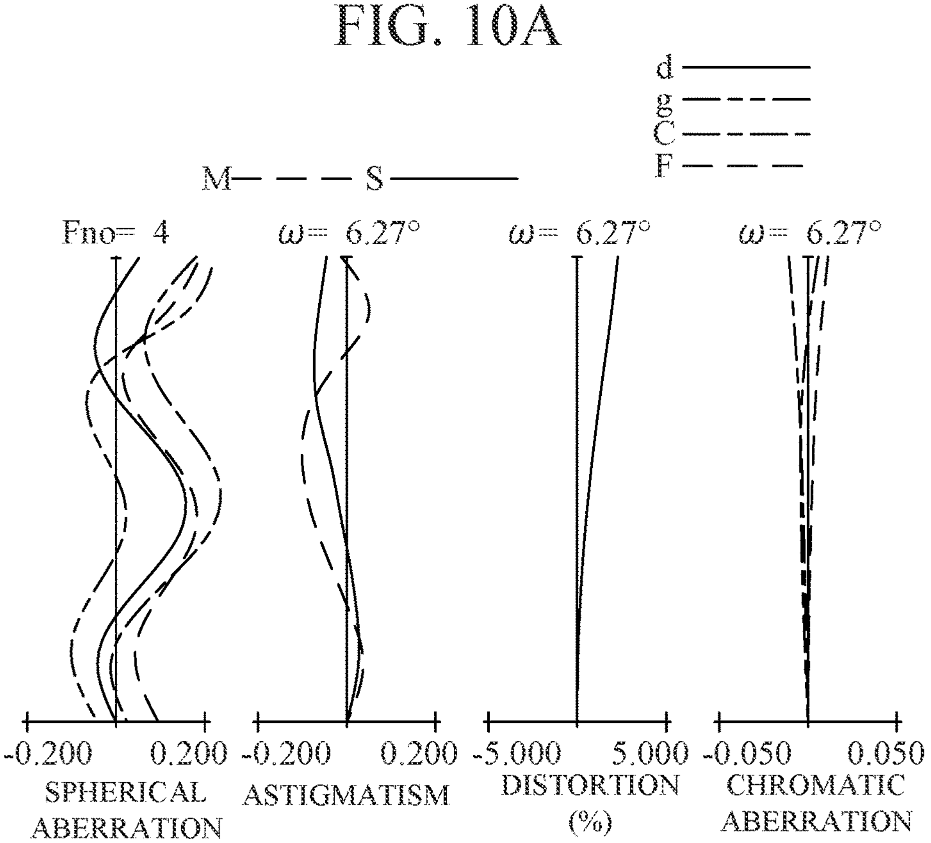

Referring now to FIGS. 9, 10A, and 10B, a description will be given of a zoom lens 1*e* according to Example 5 of the present disclosure. FIG. 9 is a sectional view of the zoom lens 1*e* at the wide-angle end in an in-focus state at infinity. FIG. 10A is an aberration diagram of the zoom lens 1*e* at the wide-angle end in the in-focus state at infinity, and FIG. 10B is an aberration diagram of the zoom lens 1*e* at the telephoto end in the in-focus state at infinity.

The zoom lens 1*e* includes, in order from the object side, to the image side a first lens unit L1 having positive refractive power, a second lens unit L2 having negative refractive power, a third lens unit L3 having negative refractive power, a fourth lens unit L4 having positive refractive power, an aperture stop SP, and a fifth lens unit L5 having positive refractive power. The first lens unit L1 does not move during zooming. The second lens unit L2 and the third lens unit L3 move during zooming and constitute the intermediate group. The fourth lens unit L4 moves during zooming. The fifth lens unit L5 is a final lens unit for imaging and does not move during zooming.

The first lens unit L1 includes, in order from the object side to the image side, a first sub-lens unit L11 having negative refractive power, a second sub-lens unit L12 having positive refractive power, and a third sub-lens unit L13 having positive refractive power. The second sub-lens unit L12 is a focus lens unit that moves from the object side to the image side during focusing from infinity to a short distance. The second lens unit L2 is a variator lens unit having negative refractive power that moves toward the image side during zooming from the wide-angle end to the telephoto end. The second lens unit L2 corresponds to the lens unit V in this example. An extender lens or the like for focal length conversion may be mounted in the fifth lens unit L5. In FIG. 9, symbol "I" denotes an image plane, which corresponds to an imaging plane of an image sensor (photoelectric conversion element such as a CCD sensor or a CMOS sensor) configured to receive an optical image formed by the zoom lens 1*e*. Arrows in FIG. 9 indicate moving loci on the optical axis OA during zooming from the wide-angle end to the telephoto end.

Numerical Examples 1 to 5 corresponding to Examples 1 to 5 will be illustrated below. In each numerical example, a surface number is the order of the surfaces counted from the object side, r represents a radius of curvature of each surface (mm), d represents a distance between surfaces on the optical axis (mm), and nd represents an absolute refractive index for the d-line in the Fraunhofer line at 1 atm of a material of each optical element having each surface. νd represents an Abbe number of the material of each optical element having each surface based on the d-line. θgf is a partial dispersion ratio of the material of each optical element to g-line and F-line. BF represents a back focus, and indicates a distance from the final lens surface to the image plane in terms of air conversion length. The overall lens length is a value obtained by adding the back focus to a distance from the first lens surface to the final lens surface. The aspherical shape is expressed as follows:

$$X = \frac{H^2/R}{1+\sqrt{1-(1+k)(H/R)^2}} + A4\cdot H^4 + A6\cdot H^6 + A8\cdot H^8 + A10\cdot H^{10} + A12\cdot H^{12} + A14\cdot H^{14} + A16\cdot H^{16} + A3\cdot H^3 + A5\cdot H^5 + A7\cdot H^7 + A9\cdot H^9 + A11\cdot H^{11} + A13\cdot H^{13} + A15\cdot H^{15}$$

where an X axis is set to an optical axis direction, an H axis is set to a direction orthogonal to the optical axis, and a light traveling direction is set positive. R is a paraxial radius of curvature. k is a conic constant. A3, A4, A5, A6, A7, A8, A9, A10, A11, A12, A13, A14, A15, and A16 are aspheric coefficients.

In each aspheric shape, "e-X" means "×10-X." An asterisk * is attached to the right side of the surface number in a case where the surface is an aspherical surface. In addition to specifications such as a focal length and an F-number, a half angle of view of the entire zoom lens system is illustrated. Each lens unit data indicates the focal length of each lens unit. A portion where the distance d between the optical surfaces is (variable) is a portion that changes during zooming, and a surface distance according to a focal length is illustrated in the attached table. WIDE, MIDDLE, and TELE mean a wide-angle end (position), an intermediate (middle) zoom position, and a telephoto end (position).

Numerical Example 1

UNIT: mm

SURFACE DATA

| Surface No | r | d | nd | νd | θgf |
|---|---|---|---|---|---|
| 1* | 4757.030 | 2.80 | 1.80100 | 35.0 | 0.5864 |
| 2 | 43.063 | 27.48 | | | |
| 3 | −75.597 | 2.20 | 1.63854 | 55.4 | 0.5484 |
| 4 | 239.886 | 0.15 | | | |
| 5 | 157.499 | 7.69 | 1.95906 | 17.5 | 0.6598 |
| 6 | −383.207 | 1.13 | | | |
| 7 | 200.472 | 13.03 | 1.53775 | 74.7 | 0.5392 |
| 8* | −92.576 | 5.51 | | | |
| 9 | 270.694 | 10.71 | 1.48749 | 70.2 | 0.5300 |
| 10 | −95.188 | 2.10 | 1.84666 | 23.8 | 0.6205 |
| 11 | −199.911 | 0.20 | | | |
| 12 | 145.369 | 2.10 | 1.80518 | 25.4 | 0.6161 |
| 13 | 56.865 | 13.53 | 1.43875 | 94.7 | 0.5340 |
| 14 | −1365.080 | 0.20 | | | |
| 15 | 206.147 | 6.00 | 1.43387 | 95.1 | 0.5373 |
| 16 | −334.432 | 0.20 | | | |
| 17 | 186.419 | 8.81 | 1.76385 | 48.5 | 0.5589 |
| 18 | −138.559 | (variable) | | | |
| 19* | 113.971 | 1.25 | 2.00100 | 29.1 | 0.5997 |
| 20 | 24.186 | 6.46 | | | |
| 21 | −41.222 | 0.90 | 1.59522 | 67.7 | 0.5442 |
| 22 | 30.642 | 6.03 | 1.85478 | 24.8 | 0.6122 |
| 23 | −62.383 | 3.17 | | | |
| 24 | −25.353 | 0.90 | 1.83481 | 42.7 | 0.5648 |
| 25 | −44.360 | (variable) | | | |
| 26 | −37.021 | 0.90 | 1.60300 | 65.4 | 0.5401 |
| 27 | 98.137 | 2.03 | 1.85478 | 24.8 | 0.6122 |
| 28 | 728.324 | (variable) | | | |
| 29* | 70.998 | 6.13 | 1.90525 | 35.0 | 0.5848 |
| 30 | −103.934 | 0.20 | | | |
| 31 | −315.843 | 1.20 | 1.95375 | 32.3 | 0.5905 |
| 32 | 166.347 | 3.47 | 1.61800 | 63.3 | 0.5441 |

-continued

| UNIT: mm | | | | | |
|---|---|---|---|---|---|
| 33 | −137.368 | (variable) | | | |
| 34 (aperture stop) | ∞ | 1.80 | | | |
| 35 | 168.020 | 1.80 | 2.00100 | 29.1 | 0.5997 |
| 36 | 49.624 | 8.61 | 1.49700 | 81.5 | 0.5375 |
| 37 | −58.231 | 0.20 | | | |
| 38 | 88.195 | 6.21 | 1.51633 | 64.1 | 0.5353 |
| 39 | −53.581 | 2.00 | 1.83481 | 42.7 | 0.5648 |
| 40 | 243.630 | 41.99 | | | |
| 41 | 64.451 | 8.16 | 1.43875 | 94.7 | 0.5340 |
| 42 | −49.102 | 4.20 | | | |
| 43 | 255.432 | 7.95 | 1.80810 | 22.8 | 0.6307 |
| 44 | −35.562 | 1.10 | 2.00100 | 29.1 | 0.5997 |
| 45 | −1466.352 | 1.00 | | | |
| 46 | 161.235 | 10.33 | 1.51742 | 52.4 | 0.5564 |
| 47 | −26.752 | 1.20 | 1.89190 | 37.1 | 0.5780 |
| 48 | 51.269 | 0.72 | | | |
| 49 | 37.558 | 10.15 | 1.48749 | 70.2 | 0.5300 |
| 50 | −58.875 | 42.54 | | | |
| image plane | ∞ | | | | |

ASPHERIC DATA

1st Surface

K = −2.00000e+00 A4 = 9.46087e−07 A6 = 1.98046e−09
A8 = 6.52397e−12 A10 = 8.28901e−15 A12 = −1.35643c−19
A14 = −1.86398e−21 A16 = −5.54763e−26 A3 = −1.81264e−06
A5 = −2.33898e−8 A7 = −1.25328e−10 A9 = −2.69889e−13
A11 = −1.52146e−16 A13 = 8.26328e−20 A15 = 1.72135e−23

8th Surface

K = −1.02997e+00 A4 = 5.48630e−07 A6 = 2.34979e−10
A8 = −1.89359e−15 A10 = −6.91188e−16 A12 = −7.25113e−20
A3 = −3.10939e−07 A5 = −1.89555e−09 A7 = −1.00407e−11
A9 = 1.71125e−14 A11 = 1.12862e−17

19th Surface

K = −2.00013e+00 A4 = 4.92053e−06 A6 = −5.35701e−08
A8 = −2.79944e−09 A10 = −1.33097e−11 A12 = −3.74615e−15
A3 = −1.29064e−06 A5 = −9.34903e−08 A7 = 1.78894e−08
A9 = 2.53904e−10 A11 = 3.63938e−13

29th Surface

K = 8.99851e−01 A4 = −2.76907e−06 A6 = −1.06240e−07
A8 = −2.88426e−09 A10 = −1.28512e−11 A12 = 1.83249e−15
A14 = 1.77924e−17 A16 = 3.66574e−21 A3 = −3.97104e−07
A5 = 2.76818e−07 A7 = 2.21858e−08 A9 = 2.43469e−10
A11 = 3.46270e−13 A13 = −4.90518e−16 A15 = −3.48843e−19

VARIOUS DATA
ZOOM RATIO 7.79

| | WIDE | MIDDLE | TELE |
|---|---|---|---|
| Focal Length | 15.40 | 45.00 | 120.00 |
| Fno | 2.72 | 2.71 | 3.65 |
| Half Angle of View | 43.86 | 18.21 | 7.03 |
| Image Height | 14.80 | 14.80 | 14.80 |
| Overall Lens Length | 347.55 | 347.55 | 347.55 |
| BF | 42.54 | 42.54 | 42.54 |
| d18 | 1.15 | 37.22 | 55.04 |
| d25 | 39.95 | 4.59 | 3.36 |
| d28 | 10.52 | 14.59 | 0.79 |
| d33 | 9.50 | 4.72 | 1.92 |

ZOOM LENS UNIT DATA

| Lens Unit | Starting Surface | Focal Length |
|---|---|---|
| 1 | 1 | 46.81 |
| 2 | 19 | −24.89 |
| 3 | 26 | −67.11 |
| 4 | 29 | 49.01 |
| 5 | 34 | 96.11 |

Numerical Example 2

UNIT: mm

SURFACE DATA

| Surface No | r | d | nd | νd | θgf |
|---|---|---|---|---|---|
| 1* | −80975.653 | 2.80 | 1.79360 | 37.1 | 0.5828 |
| 2 | 43.117 | 29.77 | | | |
| 3 | −82.938 | 2.20 | 1.64000 | 60.1 | 0.5370 |
| 4 | 214.176 | 0.15 | | | |
| 5 | 153.896 | 9.02 | 1.92286 | 18.9 | 0.6495 |
| 6 | −343.598 | 1.13 | | | |
| 7 | 198.846 | 14.41 | 1.49700 | 81.5 | 0.5375 |
| 8* | −92.193 | 8.92 | | | |
| 9 | 397.557 | 8.89 | 1.48749 | 70.2 | 0.5300 |
| 10 | −141.693 | 2.10 | 1.84666 | 23.8 | 0.6205 |
| 11 | −182.949 | 0.20 | | | |
| 12 | 346.662 | 2.10 | 1.84666 | 23.8 | 0.6205 |
| 13 | 59.135 | 17.03 | 1.49700 | 81.5 | 0.5375 |
| 14 | −372.774 | 1.55 | | | |
| 15 | 241.479 | 9.49 | 1.43875 | 94.7 | 0.5340 |
| 16 | −194.701 | 2.00 | | | |
| 17 | 136.007 | 12.05 | 1.76385 | 48.5 | 0.5589 |
| 18 | −157.804 | (variable) | | | |
| 19* | 111.551 | 1.25 | 1.95375 | 32.3 | 0.5898 |
| 20 | 24.749 | 7.06 | | | |
| 21 | −37.681 | 0.90 | 1.55200 | 70.7 | 0.5421 |
| 22 | 33.995 | 7.47 | 1.85478 | 24.8 | 0.6122 |
| 23 | −64.164 | 4.84 | | | |
| 24 | −26.795 | 0.90 | 1.83481 | 42.7 | 0.5648 |
| 25 | −55.693 | (variable) | | | |
| 26 | −37.114 | 0.90 | 1.60300 | 65.4 | 0.5401 |
| 27 | 121.589 | 1.97 | 1.85478 | 24.8 | 0.6122 |
| 28 | −4752.316 | (variable) | | | |
| 29* | 56.750 | 8.97 | 1.90525 | 35.0 | 0.5848 |
| 30 | −125.262 | 0.20 | | | |
| 31 | 1018.417 | 1.20 | 1.95375 | 32.3 | 0.5905 |
| 32 | 74.495 | 5.35 | 1.61800 | 63.3 | 0.5441 |
| 33 | −921.244 | 3.00 | | | |
| 34 (aperture stop) | ∞ | (variable) | | | |
| 35 | 104.379 | 1.80 | 2.00100 | 29.1 | 0.5997 |
| 36 | 42.340 | 8.17 | 1.49700 | 81.5 | 0.5375 |
| 37 | −70.551 | 3.43 | | | |
| 38 | 127.421 | 5.85 | 1.51633 | 64.1 | 0.5353 |
| 39 | −48.058 | 1.10 | 1.83481 | 42.7 | 0.5648 |
| 40 | 367.685 | 37.96 | | | |
| 41 | 59.181 | 8.13 | 1.43875 | 94.7 | 0.5340 |
| 42 | −46.735 | 4.20 | | | |
| 43 | 203.248 | 8.95 | 1.80810 | 22.8 | 0.6307 |
| 44 | −30.077 | 1.10 | 2.00100 | 29.1 | 0.5997 |
| 45 | 28572.268 | 0.88 | | | |
| 46 | 340.443 | 7.42 | 1.51742 | 52.4 | 0.5564 |
| 47 | −24.606 | 1.20 | 1.89190 | 37.1 | 0.5780 |
| 48 | 58.804 | 0.19 | | | |
| 49 | 36.642 | 10.96 | 1.48749 | 70.2 | 0.5300 |
| 50 | −58.875 | 39.46 | | | |
| image plane | ∞ | | | | |

ASPHERIC DATA

1st Surface

K = 2.81796e+06 A4 = 1.03360e−06 A6 = 2.22616e−09
A8 = 6.64699e−12 A10 = 8.25635e−15 A12 = −1.29115e−19
A14 = −1.86052e−21 A16 = −5.67531e−26 A3 = −2.01854e−06
A5 = −2.91974e−08 A7 = −1.31926e−10 A9 = −2.69845e−13
A11 = −1.52534e−16 A13 = 8.27334e−20 A15 = 1.72123e−23

8th Surface

K = 1.55912e−01 A4 = 8.28256e−07 A6 = 1.46760e−10
A8 = −4.25985e−13 A10 = −1.28537e−15 A12 = −1.27993e−19
A3 = −2.72967e−07 A5 = −7.75448e−10 A7 = −4.77605e−12
A9 = 3.85675e−14 A11 = 2.00524e−17

19th Surface

K = −1.60377e+01 A4 = 5.61108e−06 A6 = −3.90328e−08
A8 = −2.44561e−09 A10 = −1.47919e−11 A12 = −5.11712e−15

-continued

| UNIT: mm |
|---|
| A3 = −4.38412e−07 A5 = −3.20826e−08 A7 = 1.34667e−08 |
| A9 = 2.54149e−10 A11 = 4.41870e−13 |
| 29th Surface |
| K = −4.43728e−01 A4 = −2.05558e−06 A6 = −1.13787e−07 |
| A8 = −2.93241e−09 A10 = −1.28418e−11 A12 = 1.90141e−15 |
| A14 = 1.73953e−17 A16 = 2.34539e−21 A 3 = −8.66761e−07 |
| A5 = 2.62283e−07 A7 = 2.33620e−08 A9 = 2.42673e−10 |
| A11 = 3.52284e−13 A13 = −5.08578e−16 A15 = −2.87640e−19 |

VARIOUS DATA
ZOOM RATIO 7.41

| | WIDE | MIDDLE | TELE |
|---|---|---|---|
| Focal Length | 15.89 | 44.17 | 117.70 |
| Fno | 2.72 | 2.72 | 3.65 |
| Half Angle of View | 42.97 | 18.52 | 7.17 |
| Image Height | 14.80 | 14.80 | 14.80 |
| Overall Lens Length | 360.95 | 360.95 | 360.95 |
| BF | 39.46 | 39.46 | 39.46 |
| d18 | 1.15 | 30.49 | 44.98 |
| d25 | 30.48 | 1.53 | 2.55 |
| d28 | 16.70 | 18.81 | 0.80 |
| d34 | 4.00 | 1.50 | 4.00 |

ZOOM LENS UNIT DATA

| Lens Unit | Starting Surface | Focal Length |
|---|---|---|
| 1 | 1 | 39.27 |
| 2 | 19 | −24.20 |
| 3 | 26 | −71.56 |
| 4 | 29 | 50.05 |
| 5 | 35 | 105.61 |

Numerical Example 3

UNIT: mm

SURFACE DATA

| Surface No | r | d | nd | νd | θgf |
|---|---|---|---|---|---|
| 1* | 682.597 | 2.80 | 1.80100 | 35.0 | 0.5864 |
| 2 | 44.019 | 28.11 | | | |
| 3 | −75.579 | 2.20 | 1.63854 | 55.4 | 0.5484 |
| 4 | 271.041 | 0.15 | | | |
| 5 | 164.204 | 7.32 | 1.95906 | 17.5 | 0.6598 |
| 6 | −419.663 | 1.13 | | | |
| 7 | 196.967 | 13.71 | 1.53775 | 74.7 | 0.5392 |
| 8* | −91.986 | 5.98 | | | |
| 9 | 390.132 | 10.37 | 1.48749 | 70.2 | 0.5300 |
| 10 | −87.834 | 2.10 | 1.84666 | 23.8 | 0.6205 |
| 11 | −166.917 | 0.20 | | | |
| 12 | 130.921 | 2.10 | 1.80518 | 25.4 | 0.6161 |
| 13 | 56.379 | 11.13 | 1.43875 | 94.7 | 0.5340 |
| 14 | 287.620 | 0.41 | | | |
| 15 | 166.994 | 7.34 | 1.43387 | 95.1 | 0.5373 |
| 16 | −242.971 | 0.20 | | | |
| 17 | 217.677 | 8.47 | 1.76385 | 48.5 | 0.5589 |
| 18 | −136.489 | (variable) | | | |
| 19* | 67.023 | 1.25 | 1.95375 | 32.3 | 0.5905 |
| 20 | 23.164 | 7.54 | | | |
| 21 | −31.887 | 0.90 | 1.53775 | 74.7 | 0.5392 |
| 22 | 35.834 | 7.61 | 1.85478 | 24.8 | 0.6122 |
| 23 | −59.879 | 3.46 | | | |
| 24 | −25.848 | 0.90 | 1.85150 | 40.8 | 0.5695 |
| 25 | −63.017 | (variable) | | | |
| 26 | −41.947 | 0.90 | 1.60300 | 65.4 | 0.5401 |
| 27 | 201.255 | 1.75 | 1.85478 | 24.8 | 0.6122 |
| 28 | −723.779 | (variable) | | | |
| 29* | 74.615 | 5.31 | 1.90525 | 35.0 | 0.5848 |
| 30 | −130.844 | 0.20 | | | |
| 31 | −938.922 | 1.20 | 1.95375 | 32.3 | 0.5905 |
| 32 | 124.736 | 4.90 | 1.61800 | 63.3 | 0.5441 |
| 33 | −94.103 | (variable) | | | |
| 34 (aperture stop) | ∞ | (variable) | | | |
| 35 | 184.408 | 1.57 | 2.00100 | 29.1 | 0.5997 |
| 36 | 54.629 | 7.64 | 1.49700 | 81.5 | 0.5375 |
| 37 | −70.903 | 0.38 | | | |
| 38 | 139.687 | 6.12 | 1.51633 | 64.1 | 0.5353 |
| 39 | −54.704 | 1.81 | 1.83481 | 42.7 | 0.5648 |
| 40 | 842.741 | 49.20 | | | |
| 41 | 65.355 | 9.09 | 1.43875 | 94.7 | 0.5340 |
| 42 | −50.154 | 3.87 | | | |
| 43 | 121.895 | 9.17 | 1.80810 | 22.8 | 0.6307 |
| 44 | −32.947 | 1.10 | 2.00100 | 29.1 | 0.5997 |
| 45 | 141.812 | 1.00 | | | |
| 46 | 113.862 | 10.30 | 1.51742 | 52.4 | 0.5564 |
| 47 | −25.202 | 1.20 | 1.89190 | 37.1 | 0.5780 |
| 48 | 53.312 | 0.93 | | | |
| 49 | 38.396 | 11.60 | 1.48749 | 70.2 | 0.5300 |
| 50 | −50.176 | 39.33 | | | |
| image plane | ∞ | | | | |

ASPHERIC DATA

| 1st Surface |
|---|
| K = −1.03286e+03 A4 = 1.01446e−06 A6 = 1.99948e−09 |
| A8 = 6.47002e−12 A10 = 8.26746e−15 A12 = −1.30938e−19 |
| A14 = −1.86815e−21 A16 = −5.37265e−26 A3 = −9.63982e−07 |
| A5 = −3.11557e−08 A7 = −1.23164e−10 A9 = −2.66847e−13 |
| A11 = −1.53173e−16 A13 = 8.29800e−20 A15 = 1.71301e−23 |
| 8th Surface |
| K = −5.00024e−01 A4 = 5.88521e−07 A6 = 4.04912e−10 |
| A8 = 2.33313e−13 A10 = −8.70831e−16 A12 = −1.05191e−19 |
| A3 = −4.72093e−08 A5 = −3.87237e−09 A7 = −1.92315e−11 |
| A9 = 1.77457e−14 A11 = 1.54121e−17 |
| 19th Surface |
| K = −3.57906e−01 A4 = 5.54135e−06 A6 = −5.36395e−08 |
| A8 = −2.66631e−09 A10 = −1.33626e−11 A12 = −3.27118e−15 |
| A3 = −1.97411e−06 A5 = −1.00050e−07 A7 = 1.72704e−08 |
| A9 = 2.48154e−10 A11 = 3.61534e−13 |
| 29th Surface |
| K = 1.71424e+00 A4 = −2.82397e−06 A6 = −1.00565e−07 |
| A8 = −2.83914e−09 A10 = −1.28763e−11 A12 = 1.82130e−15 |
| A14 = 1.78348e−17 A16 = 3.44697e−21 A3 = 1.32513e−08 |
| A5 = 2.55488e−07 A7 = 2.14769e−08 A9 = 2.42368e−10 |
| A11 = 3.47724e−13 A13 = −4.90439e−16 A15 = −3.46418e−19 |

VARIOUS DATA
ZOOM RATIO 8.52

| | WIDE | MIDDLE | TELE |
|---|---|---|---|
| Focal Length | 16.57 | 49.64 | 141.12 |
| Fno | 3.11 | 2.79 | 4.11 |
| Half Angle of View | 41.77 | 16.60 | 5.99 |
| Image Height | 14.80 | 14.80 | 14.80 |
| Overall Lens Length | 357.99 | 357.99 | 357.99 |
| BF | 39.33 | 39.33 | 39.33 |
| d18 | 1.15 | 38.63 | 57.15 |
| d25 | 51.22 | 8.64 | 4.38 |
| d28 | 6.50 | 14.64 | 0.80 |
| d33 | 3.15 | 0.50 | 0.50 |
| d34 | 2.00 | 1.60 | 1.19 |

ZOOM LENS UNIT DATA

| Lens Unit | Starting Surface | Focal Length |
|---|---|---|
| 1 | 1 | 50.41 |
| 2 | 19 | −22.93 |
| 3 | 26 | −83.97 |
| 4 | 29 | 47.12 |

-continued

| UNIT: mm | | |
|---|---|---|
| 5 | 34 | ∞ |
| 6 | 35 | 120.21 |

Numerical Example 4

UNIT: mm

SURFACE DATA

| Surface No | r | d | nd | νd | θgf |
|---|---|---|---|---|---|
| 1* | 11251.524 | 2.80 | 1.80100 | 35.0 | 0.5864 |
| 2 | 42.409 | 27.61 | | | |
| 3 | −74.779 | 2.20 | 1.63854 | 55.4 | 0.5484 |
| 4 | 247.388 | 0.15 | | | |
| 5 | 160.219 | 7.76 | 1.95906 | 17.5 | 0.6598 |
| 6 | −348.406 | 2.30 | | | |
| 7 | 192.665 | 12.67 | 1.53775 | 74.7 | 0.5392 |
| 8* | −95.060 | 8.73 | | | |
| 9 | 258.088 | 10.24 | 1.48749 | 70.2 | 0.5300 |
| 10 | −98.861 | 2.10 | 1.84666 | 23.8 | 0.6205 |
| 11 | −199.624 | 0.20 | | | |
| 12 | 142.312 | 2.10 | 1.80518 | 25.4 | 0.6161 |
| 13 | 56.983 | 13.30 | 1.43875 | 94.7 | 0.5340 |
| 14 | −1153.744 | 0.26 | | | |
| 15 | 223.620 | 6.00 | 1.43387 | 95.1 | 0.5373 |
| 16 | −301.040 | 0.20 | | | |
| 17 | 186.491 | 8.39 | 1.76385 | 48.5 | 0.5589 |
| 18 | −142.986 | (variable) | | | |
| 19 | 238.037 | 0.66 | 1.43875 | 94.7 | 0.5340 |
| 20 | 126.721 | (variable) | | | |
| 21* | 103.714 | 1.25 | 2.00100 | 29.1 | 0.5997 |
| 22 | 24.986 | 6.77 | | | |
| 23 | −39.159 | 0.90 | 1.59522 | 67.7 | 0.5442 |
| 24 | 32.344 | 7.02 | 1.85025 | 30.1 | 0.5979 |
| 25 | −43.506 | 1.49 | | | |
| 26 | −27.264 | 0.90 | 1.80400 | 46.5 | 0.5577 |
| 27 | −53.319 | (variable) | | | |
| 28 | −33.895 | 0.90 | 1.60300 | 65.4 | 0.5401 |
| 29 | 61.138 | 2.31 | 1.85478 | 24.8 | 0.6122 |
| 30 | 185.293 | (variable) | | | |
| 31* | 70.752 | 5.82 | 1.90525 | 35.0 | 0.5848 |
| 32 | −112.235 | 0.20 | | | |
| 33 | −302.519 | 1.20 | 1.95375 | 32.3 | 0.5905 |
| 34 | 267.587 | 2.18 | 1.61800 | 63.3 | 0.5441 |
| 35 | −337.030 | (variable) | | | |
| 36 (aperture stop) | ∞ | 1.80 | | | |
| 37 | 156.439 | 1.10 | 2.00100 | 29.1 | 0.5997 |
| 38 | 50.688 | 7.99 | 1.49700 | 81.5 | 0.5375 |
| 39 | −54.001 | 0.20 | | | |
| 40 | 74.805 | 8.31 | 1.51633 | 64.1 | 0.5353 |
| 41 | −50.184 | 1.89 | 1.83481 | 42.7 | 0.5648 |
| 42 | 344.709 | 37.38 | | | |
| 43 | 63.319 | 8.06 | 1.43875 | 94.7 | 0.5340 |
| 44 | −47.262 | 2.47 | | | |
| 45 | 272.878 | 8.36 | 1.80810 | 22.8 | 0.6307 |
| 46 | −34.074 | 1.10 | 2.00100 | 29.1 | 0.5997 |
| 47 | −972.762 | 0.98 | | | |
| 48 | 195.543 | 9.83 | 1.51742 | 52.4 | 0.5564 |
| 49 | −26.917 | 1.20 | 1.89190 | 37.1 | 0.5780 |
| 50 | 50.707 | 1.35 | | | |
| 51 | 37.878 | 11.09 | 1.48749 | 70.2 | 0.5300 |
| 52 | −58.875 | 42.26 | | | |
| image plane | ∞ | | | | |

ASPHERIC DATA

1st Surface

K = 5.54776e+04 A4 = 1.02030e−06 A6 = 1.94479e−09
A8 = 6.51265e−12 A10 = 8.28949e−15 A12 = −1.35468e−19
A14 = −1.86411e−21 A16 = −5.54594e−26 A3 = −1.71759e−06

-continued

UNIT: mm

A5 = −2.35174e−08 A7 = −1.24279e−10 A9 = −2.69994e−13
A11 = −1.52068e−16 A13 = 8.26178e−20 A15 = 1.72130e−23

8th Surface

K = −1.09620e+00 A4 = 5.68866e−07 A6 = 2.25662e−10
A8 = 8.92790e−15 A10 = −7.01507e−16 A12 = −7.54486e−20
A3 = −3.20833e−07 A5 = −1.74657e−09 A7 = −1.00123e−11
A9 = 1.70258e−14 A11 = 1.15929e−17

21th Surface

K = −4.28440e+00 A4 = 4.94392e−06 A6 = −5.74230e−08
A8 = −2.83872e−09 A10 = −1.33801e−11 A12 = −3.77089e−15
A3 = −7.48057e−07 A5 = −6.83566e−08 A7 = 1.84340e−08
A9 = 2.55765e−10 A11 = 3.66150e−13

31th Surface

K = 1.68740e+00 A4 = −2.62447e−06 A6 = −1.07776e−07
A8 = −2.88389e−09 A10 = −1.28078e−11 A12 = 1.80598e−15
A14 = 1.78772e−17 A16 = 3.56583e−21 A3 = −7.46477e−07
A5 = 2.77185e−07 A7 = 2.23204e−08 A9 = 2.42673e−10
A11 = 3.45886e−13 A13 = −4.91556e−16 A15 = −3.47238e−19

VARIOUS DATA
ZOOM RATIO 7.31

| | WIDE | MIDDLE | TELE |
|---|---|---|---|
| Focal Length | 15.85 | 45.00 | 115.88 |
| Fno | 2.71 | 2.71 | 3.65 |
| Half Angle of View | 43.03 | 18.21 | 7.28 |
| Image Height | 14.80 | 14.80 | 14.80 |
| Overall Lens Length | 346.18 | 346.18 | 346.18 |
| BF | 42.26 | 42.26 | 42.26 |
| d18 | 0.20 | 8.53 | 13.42 |
| d20 | 0.29 | 30.28 | 44.33 |
| d27 | 33.60 | 1.20 | 2.85 |
| d30 | 14.09 | 14.78 | 0.80 |
| d35 | 14.02 | 7.41 | 0.80 |

ZOOM LENS UNIT DATA

| Lens Unit | Starting Surface | Focal Length |
|---|---|---|
| 1 | 1 | 44.40 |
| 2 | 19 | −618.73 |
| 3 | 21 | −31.71 |
| 4 | 28 | −54.44 |
| 5 | 31 | 55.44 |
| 6 | 36 | 83.91 |

Numerical Example 5

UNIT: mm

SURFACE DATA

| Surface No | r | d | nd | νd | θgf |
|---|---|---|---|---|---|
| 1* | 293.374 | 2.80 | 1.80100 | 35.0 | 0.5864 |
| 2 | 43.844 | 19.49 | | | |
| 3 | 722.817 | 2.20 | 1.80100 | 35.0 | 0.5864 |
| 4 | 186.698 | 12.23 | | | |
| 5 | −85.899 | 2.20 | 1.63854 | 55.4 | 0.5484 |
| 6 | 614.885 | 0.15 | | | |
| 7 | 198.065 | 7.53 | 1.95906 | 17.5 | 0.6598 |
| 8 | −366.904 | 2.53 | | | |

| UNIT: mm | | | | | |
|---|---|---|---|---|---|
| 9 | 160.257 | 16.32 | 1.52841 | 76.5 | 0.5396 |
| 10* | −104.808 | 10.02 | | | |
| 11 | 193.188 | 11.88 | 1.49700 | 81.5 | 0.5375 |
| 12 | −163.662 | 2.10 | 1.80810 | 22.8 | 0.6307 |
| 13 | −278.157 | 0.20 | | | |
| 14 | 177.253 | 2.10 | 1.80518 | 25.4 | 0.6161 |
| 15 | 57.914 | 16.89 | 1.43875 | 94.7 | 0.5340 |
| 16 | −311.191 | 0.66 | | | |
| 17 | 208.858 | 6.00 | 1.43387 | 95.1 | 0.5373 |
| 18 | −526.675 | 0.48 | | | |
| 19 | 185.542 | 5.18 | 1.43387 | 95.1 | 0.5373 |
| 20 | −919.505 | 0.64 | | | |
| 21 | 119.886 | 8.67 | 1.76385 | 48.5 | 0.5589 |
| 22 | −297.546 | (variable) | | | |
| 23* | 155.145 | 1.25 | 2.00330 | 28.3 | 0.5980 |
| 24 | 22.448 | 7.04 | | | |
| 25 | −65.034 | 0.90 | 1.52841 | 76.5 | 0.5396 |
| 26 | 26.504 | 9.62 | 1.78880 | 28.4 | 0.6009 |
| 27 | −40.069 | 1.47 | | | |
| 28 | −29.752 | 0.90 | 1.77250 | 49.6 | 0.5520 |
| 29 | −178.790 | (variable) | | | |
| 30 | −25.906 | 0.90 | 1.60300 | 65.4 | 0.5401 |
| 31 | 53.733 | 2.53 | 1.85478 | 24.8 | 0.6122 |
| 32 | 1560.803 | (variable) | | | |
| 33* | 51.701 | 6.74 | 1.90525 | 35.0 | 0.5848 |
| 34 | −173.045 | 0.20 | | | |
| 35 | 208.217 | 1.20 | 1.95375 | 32.3 | 0.5905 |
| 36 | 35.260 | 6.83 | 1.61800 | 63.3 | 0.5441 |
| 37 | 336.533 | (variable) | | | |
| 38 (aperture stop) | ∞ | 1.80 | | | |
| 39 | 82.389 | 1.80 | 1.95375 | 32.3 | 0.5905 |
| 40 | 56.298 | 7.35 | 1.49700 | 81.5 | 0.5375 |
| 41 | −105.447 | 7.77 | | | |
| 42 | 98.328 | 7.54 | 1.51633 | 64.1 | 0.5353 |
| 43 | −42.277 | 2.00 | 1.85150 | 40.8 | 0.5695 |
| 44 | 123.007 | 20.94 | | | |
| 45 | 60.046 | 8.83 | 1.43875 | 94.7 | 0.5340 |
| 46 | −42.904 | 4.20 | | | |
| 47 | 100.749 | 9.16 | 1.80810 | 22.8 | 0.6307 |
| 48 | −27.659 | 1.10 | 2.00100 | 29.1 | 0.5997 |
| 49 | 118.913 | 1.00 | | | |
| 50 | 81.793 | 9.51 | 1.51742 | 52.4 | 0.5564 |
| 51 | −27.532 | 1.20 | 1.90525 | 35.0 | 0.5848 |
| 52 | 61.505 | 0.28 | | | |
| 53 | 39.628 | 9.55 | 1.51633 | 64.1 | 0.5353 |
| 54 | −58.875 | 44.14 | | | |
| image plane | ∞ | | | | |

UNIT: mm

ASPHERIC DATA

1st Surface

K = −3.44971e+01 A4 = 8.53550e−07 A6 = 3.82655e−09
A8 = 6.63229e−12 A10 = 8.24360e−15 A12 = −5.16527e−19
A14 = −1.85266e−21 A16 = −5.25439e−26 A3 = −6.21894e−07
A5 = −4.74839e−08 A7 = −1.80525e−10 A9 = −2.49357e−13
A11 = −1.51402e−16 A13 = 8.96210e−20 A15 = 1.63703e−23

10th Surface

K = −2.95095e+00 A4 = 4.27700e−07 A6 = 1.45247e−10
A8 = 2.25802e−13 A10 = −6.22602e−16 A12 = −8.41239e−20
A3 = 2.67717e−07 A5 = −1.10611e−09 A7 = −9.81919e−12
A9 = 8.96999e−15 A11 = 1.22692e−17

23rd Surface

K = −8.64316e+01 A4 = 6.46097e−06 A6 = −8.40957e−08
A8 = −3.02313e−09 A10 = −1.27004e−11 A12 = −4.75910e−15
A3 = 5.32901e−06 A5 = 1.32916e−07 A7 = 2.12859e−08
A9 = 2.51982e−10 A11 = 3.68446e−13

33rd Surface

K = −1.28543e−02 A4 = −2.42156e−06 A6 = −1.11378e−07
A8 = −2.84388e−09 A10 = −1.29849e−11 A12 = 6.47086e−17
A14 = 1.78237e−17 A16 = 5.62346e−21 A3 = −2.59081e−07
A5 = 3.24367e−07 A7 = 2.22569e−08 A9 = 2.40461e−10
A11 = 3.74538e−13 A13 = −4.31951e−16 A15 = −4.31461e−19

VARIOUS DATA
ZOOM RATIO 7.63

| | WIDE | MIDDLE | TELE |
|---|---|---|---|
| Focal Length | 17.66 | 44.74 | 134.64 |
| Fno | 3.00 | 3.00 | 4.00 |
| Half Angle of View | 39.97 | 18.30 | 6.27 |
| Image Height | 14.80 | 14.80 | 14.80 |
| Overall Lens Length | 368.55 | 368.55 | 368.55 |
| BF | 44.14 | 44.14 | 44.14 |
| d22 | 1.50 | 24.26 | 35.51 |
| d29 | 13.22 | 3.96 | 7.16 |
| d32 | 29.61 | 24.52 | 0.80 |
| d37 | 16.19 | 7.78 | 17.05 |

ZOOM LENS UNIT DATA

| Lens Unit | Starting Surface | Focal Length |
|---|---|---|
| 1 | 1 | 34.52 |
| 2 | 23 | −25.89 |
| 3 | 30 | −52.36 |
| 4 | 33 | 60.92 |
| 5 | 38 | 93.71 |

TABLE 1 below summarizes values of various inequalities according to Examples 1 to 5.

TABLE 1

| | Ex. 1 | Ex. 2 | Ex. 3 | Ex. 4 | Ex. 5 |
|---|---|---|---|---|---|
| (1) n_nf | 2.001 | 1.954 | 1.954 | 2.001 | 2.003 |
| (2) θ_pr + 0.00253 * ν_pr | 0.675 | 0.675 | 0.675 | 0.674 | 0.673 |
| (3) f1/f2 | −1.88 | −1.62 | −2.20 | −1.40 | −1.33 |
| (4) f2/fw | −1.62 | −1.52 | −1.38 | −2.00 | −1.47 |
| (5) f21/f2 | 1.24 | 1.39 | 1.64 | 1.05 | 1.02 |
| (6) n_ave | 1.82 | 1.80 | 1.80 | 1.81 | 1.77 |
| (7) ν | 67.74 | 70.70 | 74.70 | 67.74 | 76.46 |
| (8) (θ_pr − θ_nr)/(ν_pr − ν_nr) | −0.0026 | −0.0026 | −0.0027 | −0.0024 | −0.0023 |
| (9) (θ_pave − θ_nave)/(ν_pave − ν_nave) | −0.0020 | −0.0020 | −0.0019 | −0.0017 | −0.0016 |

Image Pickup Apparatus

Figure 11:
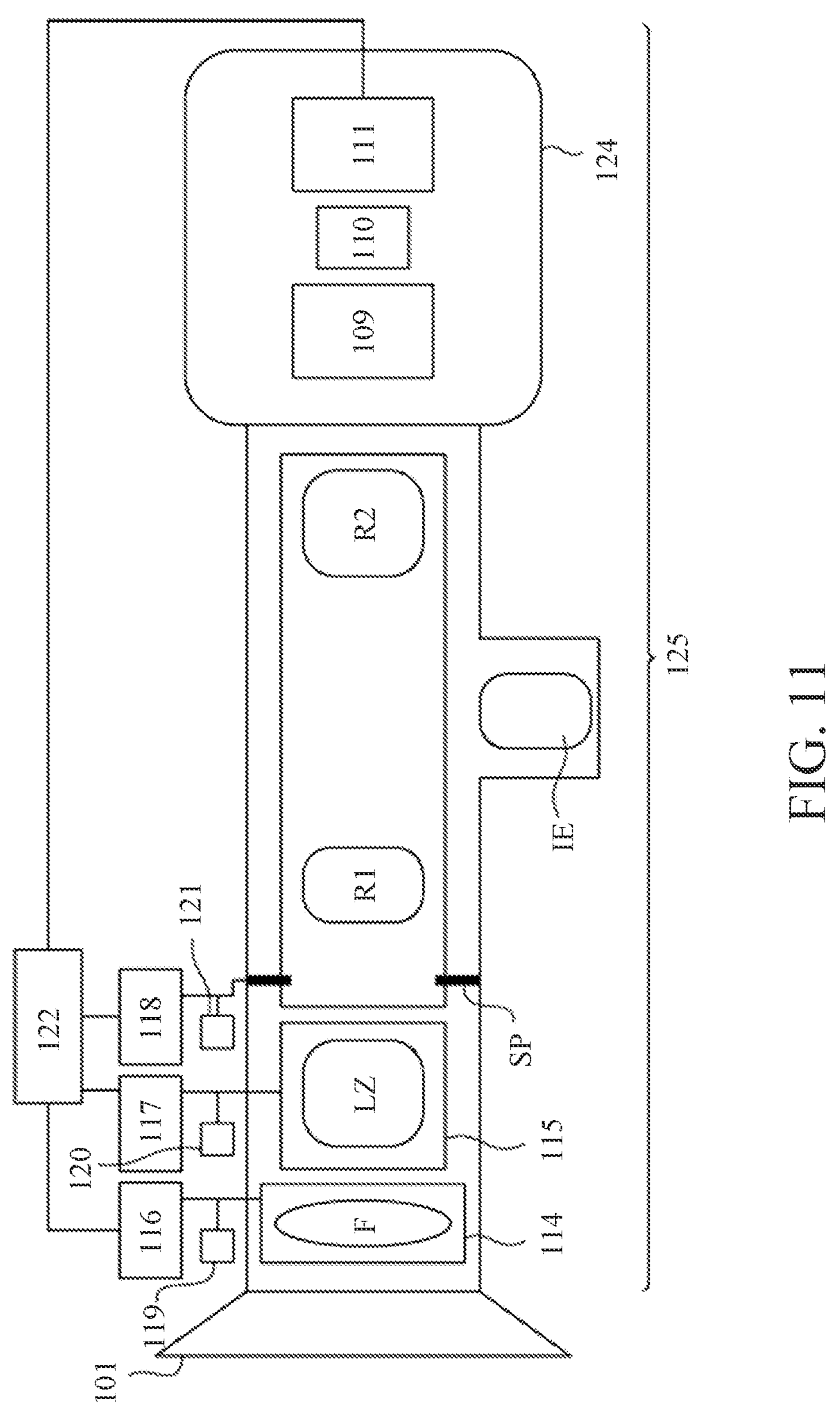
FIG. 11 is a configuration diagram of an image pickup apparatus having the zoom lens according to any one of the examples.

Referring now to FIG. 11, a description will be given of an image pickup apparatus 125 having the zoom lens according to any one of the above examples. FIG. 11 is a configuration diagram of the image pickup apparatus 125. In FIG. 11, reference numeral 101 denotes the zoom lens according to any one of Examples 1 to 5. Reference numeral 124 denotes a camera body (image pickup apparatus body). The zoom lens 101 is attachable to and detachable from the camera body 124. Reference numeral 125 denotes the image pickup apparatus in which the zoom lens 101 is attached to the camera body 124. The zoom lens 101 includes a first lens unit F (corresponding to the first lens unit L1), a zoom unit LZ, and a rear lens unit R for imaging (lens units R1 and R2: corresponding to the final lens unit). The first lens unit F includes a lens unit that moves during focusing.

The zoom unit LZ includes at least two lens units that move during zooming. An aperture stop SP, a lens unit R1, and a lens unit R2 are disposed on the image side of the zoom unit LZ. The image pickup apparatus 125 also has a lens unit IE that can be inserted into and removed from the optical path between the lens unit R1 and the lens unit R2. Inserting the lens unit IE between the lens unit R1 and the lens unit R2 can change a focal length range of the entire system of the zoom lens 101.

Reference numerals 114 and 115 denote driving mechanisms for driving the first lens unit F and the zoom unit LZ in the optical axis direction, respectively. The driving mechanism can be configured including a helicoid, a cam, or the like. Reference numerals 116 to 118 denote motors (driving units) for driving the driving mechanisms 114 and 115 and the aperture stop SP, respectively. Reference numerals 119 to 121 denote detectors for detecting the position of the first lens unit F on the optical axis, the position of the zoom unit LZ on the optical axis, and the aperture diameter of the aperture stop SP, respectively. The detector may include an encoder, potentiometer, photosensor, and the like.

In the camera body 124, reference numeral 109 denotes a glass block including an optical filter, etc., and reference numeral 110 denotes an image sensor (photoelectric conversion element) configured to capture an object image formed by the zoom lens 101. The image sensor 110 may include a CCD sensor, a CMOS sensor, or the like. Reference numerals 111 and 122 denote a CPU as a processing unit (control unit) in the camera body 124 and a CPU as a processing unit (control unit) in the zoom lens 101, respectively.

Each example can provide, for example, a zoom lens and an image pickup apparatus beneficial to a wide angle of view, high zoom ratio, and high optical performance over the entire zoom range.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2022-127105, filed on Aug. 9, 2022, which is hereby incorporated by reference herein in its entirety.

What is claimed is:

1. A zoom lens comprising, in order from an object side to an image side, a first lens unit having positive refractive power that does not move during zooming, an intermediate group that has at least two lens units that move during zooming, a lens unit having positive refractive power that moves during zooming, and a final lens unit having positive refractive power that does not move during zooming, wherein each distance between adjacent lens units changes during zooming, wherein the intermediate group includes at least one lens unit having negative refractive power and including at least three lenses, wherein, in the lens unit having negative refractive power of the intermediate group, a lens unit V disposed closest to an object includes at least one positive lens and at least one negative lens, and a lens disposed closest to the object in the lens unit V is a negative lens, and wherein the following inequalities are satisfied:

$$1.930<n\_nf<2.200$$

$$0.648<\theta\_pr+0.00253\times\nu\_pr<0.678$$

$$-3.00<f1/f2<-1.15$$

$$-2.60<f1/f2<-1.15$$

where n_nf is a refractive index of a negative lens disposed closest to the object in the lens unit V, θ_pr and v_pr are a partial dispersion ratio and an Abbe number of a positive lens disposed closest to an image plane in the lens unit V, and f1 is a focal length of the first lens unit, and f2 is a focal length of the lens unit V.

2. The zoom lens according to claim 1, where the following inequality is satisfied:

$$-2.50<f2/fw<0.00$$

where fw is a focal length of the zoom lens at a wide-angle end.

3. The zoom lens according to claim 1, where the following inequality is satisfied:

$$0.70<f21/f2<2.00$$

where f21 is a focal length of a lens disposed closest to the object in the lens unit V.

4. The zoom lens according to claim 1, where the following inequality is satisfied:

$$1.70<n\_ave<2.00$$

where n_ave is an average refractive index of all lenses included in the lens unit V.

5. The zoom lens according to claim 1, where the lens unit V includes a negative lens having an Abbe number v that satisfies the following inequality:

$$60<\nu<100.$$

6. The zoom lens according to claim 1, wherein the following inequality is satisfied:

$$-0.0030<(\theta\_pave-\theta\_nave)/(\nu\_pave-\nu\_nave)<0.0000$$

where v_pave and θ_pave are an average Abbe number and an average partial dispersion ratio of all positive lenses included in the lens unit V, and v_nave and θ_nave are an average Abbe number and an average partial dispersion ratio of all negative lenses included in the lens unit V, respectively.

7. The zoom lens according to claim 1, wherein a lens disposed closest to the image plane and a lens second closest to the image plane in the lens unit V are a positive lens and a negative lens, respectively.

8. The zoom lens according to claim 1, wherein the following inequality is satisfied:

$$-0.0025<(\theta\_pr-\theta\_nr)/(\nu\_pr-\nu\_nr)<0.0000$$

where $\nu\_nr$ and $\theta\_nr$ are an Abbe number and a partial dispersion ratio of a lens disposed closest to the image plane among the negative lenses included in the lens unit V, respectively.

9. The zoom lens according to claim 1, wherein the lens unit V consists of four lenses.

10. The zoom lens according to claim 1, wherein the first lens unit includes, in order from the object side to the image side, a first sub-lens unit having negative refractive power, a second sub-lens unit having positive refractive power, and a third sub-lens unit having positive refractive power, wherein each distance between adjacent sub-lens units changes during focusing, and wherein the first sub-lens unit does not move during focusing, the second sub-lens unit moves during focusing, and the third sub-lens unit does not move during focusing.

11. The zoom lens according to claim 1, wherein the intermediate group includes, in order from the object side to the image side, a second lens unit, a third lens unit, and a fourth lens unit, and wherein the lens unit V is the second lens unit.

12. The zoom lens according to claim 1, wherein the intermediate group comprises, in order from the object side to the image side, a second lens unit, a third lens unit, a fourth lens unit, and a fifth lens unit, and wherein the lens unit V is the third lens unit.

13. An image pickup apparatus comprising:

the zoom lens according to claim 1, and an image sensor configured to capture an image formed by the zoom lens.

14. The zoom lens according to claim 1, wherein the following inequality is satisfied:

$$-2.20 \leq f1/f2 < -1.15.$$

15. A zoom lens comprising, in order from an object side to an image side, a first lens unit having positive refractive power that does not move during zooming, an intermediate group that has at least two lens units that move during zooming, a lens unit having positive refractive power that moves during zooming, and a final lens unit having positive refractive power that does not move during zooming, wherein each distance between adjacent lens units changes during zooming, wherein the intermediate group includes at least one lens unit having negative refractive power and including at least three lenses, wherein, in the lens unit having negative refractive power of the intermediate group, a lens unit V disposed closest to an object includes at least one positive lens and at least one negative lens, and a lens disposed closest to the object in the lens unit V is a negative lens, and wherein the following inequalities are satisfied:

$$1.930 < n\_nf < 2.200$$

$$0.648 < \theta\_pr + 0.00253 \times \nu\_pr < 0.678$$

$$-3.00 < f1/f2 < -1.15$$

$$-2.00 \leq f2/fw < 0.0$$

where n_nf is a refractive index of a negative lens disposed closest to the object in the lens unit V, $\theta\_pr$ and $\nu\_pr$ are a partial dispersion ratio and an Abbe number of a positive lens disposed closest to an image plane in the lens unit V, and f1 is a focal length of the first lens unit, and f2 is a focal length of the lens unit V, and fw is a focal length of the zoom lens at a wide-angle end.

* * * * *